(12) United States Patent
Uotani

(10) Patent No.: US 6,947,839 B2
(45) Date of Patent: Sep. 20, 2005

(54) NAVIGATION SYSTEM, ROUTE SEARCHING METHOD, AND MAP INFORMATION GUIDE METHOD

(75) Inventor: Kazushi Uotani, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 114 days.

(21) Appl. No.: 10/602,728

(22) Filed: Jun. 25, 2003

(65) Prior Publication Data

US 2004/0024523 A1 Feb. 5, 2004

(30) Foreign Application Priority Data

Aug. 5, 2002 (JP) .................................. P2002-227430

(51) Int. Cl.⁷ .................... G01C 21/00; G09B 29/10
(52) U.S. Cl. .............. 701/210; 701/201; 701/209; 340/995.13
(58) Field of Search .................... 701/201, 202, 701/208, 209, 211, 214, 210, 204; 340/988, 991, 995.13, 995.17, 995.21, 995.23, 995.25, 995.27; 342/357.1, 357.07; 455/414.2, 414.3, 456.1

(56) References Cited

U.S. PATENT DOCUMENTS 5,428,545 A * 6/1995 Maegawa et al. ........... 701/210
5,459,667 A * 10/1995 Odagaki et al. ............ 701/209
6,061,628 A * 5/2000 Hayashi et al. ............. 701/208
6,226,590 B1 * 5/2001 Fukaya et al. .............. 701/209

FOREIGN PATENT DOCUMENTS

| JP | 9-222332 A | 8/1997 |
| JP | 11-287667 A | 10/1999 |
| JP | 11-304514 A | 11/1999 |
| JP | 2001-159534 A | 6/2001 |

* cited by examiner

Primary Examiner—Tan Q. Nguyen
(74) Attorney, Agent, or Firm—Birch, Stewart, Kolasch & Birch, LLP

(57) ABSTRACT

A route searching section 33 determines whether the area of the current position is an urban area or a suburban area, sets a predetermined area S or a predetermined time Δt responsive to the determination result, and determines the presence or absence of restriction on each time restriction road depending on whether or not a time restriction road exists in the predetermined area S centering around the current position and whether or not the restriction time period of the time restriction road overlaps the time period in the predetermined time Δt from the current time to. If the route searching section determines the presence of restriction, it searches for a route avoiding the time restriction road.

7 Claims, 15 Drawing Sheets

GUIDE ROUTE    CURRENT POSITION    TIME RESTRICTION ROAD
               OF VEHICLE          (WARNING COLOR)

GUIDE ROUTE    CURRENT POSITION    TIME RESTRICTION ROAD
               OF VEHICLE          (INHIBITION COLOR)

NAVIGATION SYSTEM, ROUTE SEARCHING METHOD, AND MAP INFORMATION GUIDE METHOD

BACKGROUND OF THE INVENTION

This invention is pertinent to a navigation system and relates in particular to a navigation system, a route searching method, and a map information guide method for appropriately bypassing a time restriction road and searching for a route from the current position of the vehicle to a destination and guiding the driver through the route.

In recent years, a navigation system for displaying the current position of a mobile unit on a map and searching for an optimum route to a destination and guiding the user through the route is developed heavily. Recently, an attempt is made to provide a navigation system for guiding the user through a bypass avoiding traffic restriction and congestion based on road traffic information, etc., thereby enabling the user to drive to the destination more smoothly.

In route searching in such a navigation system, if candidates for a route found as the user sets a destination contain a time restriction road, hitherto, route searching is conducted assuming that the road is permanently passable or impassable. Thus, the navigation system guides the user through a route taking a long way to avoid an essentially passable road or guides the user through an essentially impassable road and when the mobile unit is about to reach a time restriction road, the user cannot advance the mobile unit because of the time restriction, etc.; this is a problem.

Although a run route to bypass a time restriction road is displayed, the user cannot understand why the route presented on the display screen indicates a bypass taking a long way; this is a problem.

Further, if the user makes a determination as to which route to select and drives while seeing a map displayed on the display screen without setting a route, although time restriction information exists, it is not displayed on the display screen and thus the user drives while being unaware of a time restriction road and suddenly encounters the time restriction road, and his or her way is blocked; this is a problem.

Recently, however, various navigation systems and route searching methods for considering the restriction time period of such a time restriction road to search for an optimum route and guide the user through the optimum route or differentially display a time restriction road and guide the user are proposed.

For example, the Unexamined Japanese Patent Application Publication No. Hei11-304514 discloses a method of estimating a passage schedule time through a road where a traffic restriction time period is set and determining whether or not the road can be used, thereby searching for a recommended route without excluding time restriction roads. A route searching apparatus using this method performs searching consisting of initial searching and re-searching. In the initial searching, the route searching apparatus searches for a recommended route by assuming that there is no restriction as to a link outside the range of a predetermined distance range, such as 10 km, in the periphery of the current position. In the re-searching, the route searching apparatus checks to see if a time restriction link exists in a predetermined range in the destination direction on the recommended route each time the user drives a predetermined distance, for example. If a time restriction link exists, the route searching apparatus estimates the vehicle passage time through the link and checks to see if the estimated time is within the range of the restriction time period including predetermined times preceding and following the restriction time period. If the time is within the range, the route searching apparatus re-searches for a route so as to bypass the link and updates the recommended route data and display of the recommended route.

The Unexamined Japanese Patent Application Publication No. Hei11-287667 discloses a method of making it possible to also set an appropriate route and guide the user considering the passage restriction on a season passage restriction road. A vehicle-installed navigation system using the method calculates the entry prediction time into a dynamic restriction link on a route every given time and if the situation is changed to a situation in which entry into the dynamic restriction link is not allowed at the calculated entry prediction time, a route re-calculation request is made. If the current position is near to a bypass-possible intersection, if a dynamic restriction link exists in a given range, or if the vehicle goes off the shortest route, a route re-calculation request is also made. Therefore, even if the arrival prediction time at a dynamic restriction link varies depending on the vehicle run state and the presence or absence of restriction changes after a route is once set, an optimum route, namely, an appropriate route bypassing the dynamic restriction link or the shortest route containing the dynamic restriction link can be again set.

The Unexamined Japanese Patent Application Publication No. Hei9-222332 discloses a method of searching for an optimum route also including a restriction road and aggressively using the restriction road if the restriction road is passable. A vehicle route guide apparatus using the method searches for an optimum route from the current place where the vehicle exists to the destination also including passage restriction road zones. If the found optimum route contains a passage restriction zone, the vehicle route guide apparatus determines whether or not passage is allowed a predetermined distance before the passage restriction zone. If passage is not allowed, the vehicle route guide apparatus excludes the passage restriction zone and again searches for an optimum route from the beginning. Then, the vehicle route guide apparatus displays the optimum route and the current place where the vehicle exists on a road map, and guides the user to the destination.

The Unexamined Japanese Patent Application Publication No. 2001-159534 discloses a method of superposing the current position of the vehicle on a map for display and determining whether or not partial restriction information exists in the target road and if partial restriction information exists, displaying the road in a different display mode from the normal display mode, thereby making it possible to report precise road information to the user. To draw in a map drawing section, a navigation system using the method determines whether or not the road zone to be drawn has partial restriction information of time period traffic suspension, etc., from restriction information data read from data read memory. If the road zone has partial restriction information, the road zone is drawn in a preset color different from the normal road zone drawing color. If the road zone does not have partial restriction information, the road zone is drawn in the normal road zone drawing color. This enables the user to previously recognize that partial restriction information exists in the forward road by seeing a display section at driving time, and enables the user to determine a route with lead time.

However, in the navigation system as described above, the range to check to see if a time restriction road exists is fixed regardless of whether the area of the current position of the vehicle is an urban or suburban area. Thus, a search must be made for a time restriction road over a wide range more than necessary in an urban area, etc., where a large number of complicated restrictions are placed or arrival prediction times at a large number of time restriction roads are all calculated and thus processing of determining the presence or absence of restriction on each time restriction road becomes very complicated and it takes time more than necessary in searching for a route bypassing the time restriction roads; this is a problem.

In differential display of a time restriction road, the presence of the time restriction road can be recognized, but the time restriction road is not displayed in such a manner that the relationship between the restriction time period and the current time can be recognized and therefore there is a problem of taking the trouble to take a long way to bypass the passable road at the current point in time.

SUMMARY OF THE INVENTION

It is therefore an object of the invention to provide a navigation system that can guide the user rapidly and reliably through an optimum route considering the restriction time period of a time restriction road in both an urban area and a suburban area.

It is another object of the invention to provide a navigation system for enabling the user to easily recognize the time relation between the restriction time period of a time restriction road and the current time.

According to the invention, there is provided a navigation system including position detector for detecting the current position of a mobile unit, map information acquisition section for acquiring map information, traffic restriction information acquisition section for acquiring traffic restriction information, time information acquisition section for acquiring current date, day of week, and time information, input section for entering a route point, route searching section for searching for an optimum route passing through the route point from the current position at the current date, day of week, and time based on the map information and the traffic restriction information, and output section for guiding the user through the found route by display or voice, when the route searching section includes area determination section for determining whether the area of the current position is an urban area or a suburban area, setting section for setting a predetermined area or a predetermined time responsive to the determination result, and restriction presence or absence determination section for determining the presence or absence of restriction on each time restriction road depending on whether or not a time restriction road exists in the predetermined area centering around the current position and whether or not the restriction time period of the time restriction road overlaps the time period in the predetermined time from the current time, and if the restriction presence or absence determination section determines the presence of restriction, the route searching section searches for a route avoiding the time restriction road.

In the navigation system according to the invention, if the area of the current position is an urban area, the setting section sets the predetermined area to a narrow area or the predetermined time to a long time.

In the navigation system according to the invention, if the area of the current position is a suburban area, the setting section sets the predetermined area to a wide area or the predetermined time to a short time.

In the navigation system according to the invention, the map information is provided with attribute information indicating urban/suburban area and the area determination section determines whether the area of the current position is an urban area or a suburban area based on the attribute information.

In the navigation system according to the invention, the input section enables the user to enter attribute information indicating urban/suburban area and the area determination section determines whether the area of the current position is an urban area or a suburban area based on the attribute information entered by the user.

In the navigation system according to the invention, whenever the mobile unit moves out of the predetermined area previously set or whenever the predetermined time previously set elapses, the restriction presence or absence determination section determines the presence or absence of restriction on the time restriction road.

According to the invention, there is provided a navigation system including map information acquisition section for acquiring map information, traffic restriction information acquisition section for acquiring traffic restriction information, time information acquisition section for acquiring current date, day of week, and time information, output section for providing the user with the map information or the traffic restriction information by display or voice, restriction time determination section, if a time restriction road exists in a guide area, for determining the difference between the restriction time period of the time restriction road, and the current time and out put mode selector for selecting an output mode of the time restriction road varying depending on the determination result, wherein the output section guides the user through the time restriction road according to the selected output mode.

In the navigation system according to the invention, the output mode selector selects an output mode of the time restriction road varying depending on the case where the current time is contained in the restriction time period of the time restriction road in the guide area, the case where the time from the current time to the restriction start time of the time restriction road is within a predetermined time, or the case where the time from the current time to the restriction start time of the time restriction road is longer than the predetermined time.

According to the invention, there is provided a route searching method including a position detection step of detecting the current position of a mobile unit, a map information acquisition step of acquiring map information, a traffic restriction information acquisition step of acquiring traffic restriction information, a time information acquisition step of acquiring current date, day of week, and time information, an input step of entering a route point, a route searching step of searching for an optimum route passing through the route point from the current position at the current date, day of week, and time based on the map information and the traffic restriction information, and an output step of guiding the user through the found route by display or voice, wherein the route searching step includes an area determination step of determining whether the area of the current position is an urban area or a suburban area, a setting step of setting a predetermined area or a predetermined time responsive to the determination result, and a restriction presence or absence determination step of determining the presence or absence of restriction on each time restriction road depending on whether or not a time restriction road exists in the predetermined area centering around the current position and whether or not the restriction time period of the time restriction road overlaps the time period in the predetermined time from the current time, and if the restriction presence or absence determination step determines the presence of restriction, the route searching step searches for a route avoiding the time restriction road.

According to the invention, there is provided a map information guide method including a map information acquisition step of acquiring map information, a traffic restriction information acquisition step of acquiring traffic restriction information, a time information acquisition step of acquiring current date, day of week, and time information, an output step of providing the user with the map information or the traffic restriction information by display or voice, a restriction time determination step, if a time restriction road exists in a guide area, of determining the difference between the restriction time period of the time restriction road and the current time, and an output mode selection step of selecting an output mode of the time restriction road varying depending on the determination result, wherein the output step guides the user through the time restriction road according to the selected output mode.

DETAILED DESCRIPTION OF THE PREFERRED EMBODIMENTS

Referring now to the accompanying drawings, there are shown preferred embodiments of the invention.

(First Embodiment)

Figure 1:
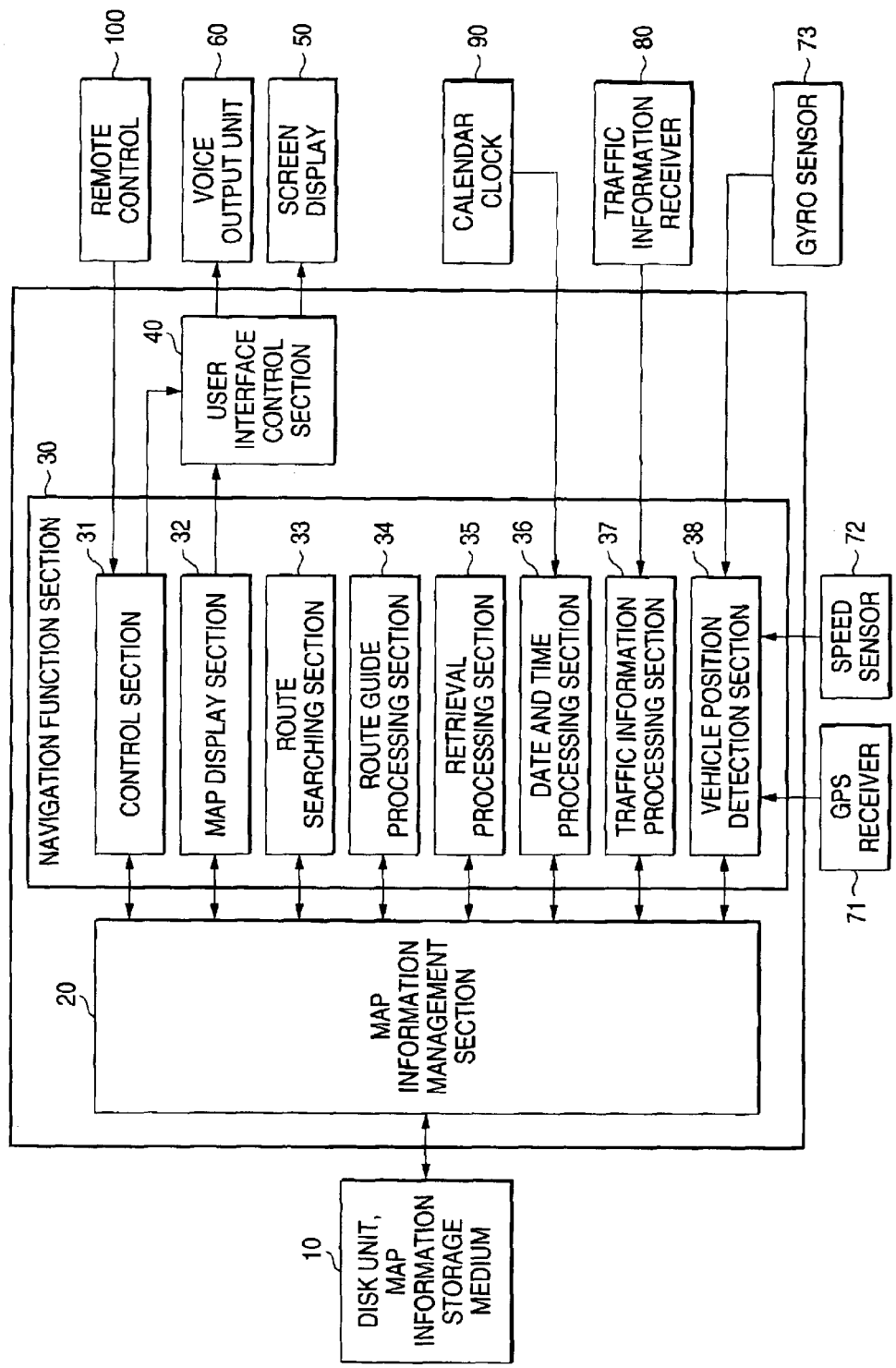
FIG. 1 is a block diagram to show the configuration of a navigation system in a first embodiment of the invention.

FIG. 1 is a block diagram to show the configuration of a navigation system in a first embodiment of the invention. It shows the configuration of the navigation system installed in a vehicle as a mobile unit incorporating the invention.

Numeral 10 denotes a disk unit as map information acquisition section for reading map information from an information storage medium such as a CD-ROM (compact disk-read-only memory) or a DVD-ROM (digital versatile disk-read-only memory), numeral 20 denotes a map information management section for managing read map information, and numeral 30 denotes a navigation function section for providing various navigation functions based on the map information. Numeral 40 denotes a user interface control section for controlling output of display information and voice information of a map image, a guide voice, etc., numeral 50 denotes a screen display such as a liquid crystal display for outputting display information, and numeral 60 denotes a voice output unit such as a loudspeaker for outputting voice information; these make up output section.

The navigation function section 30 has a control section 31 for performing various types of control, a map display section 32 for performing map display processing, a route searching section 33 as route searching section for searching for a route, a route guide processing section 34 for guiding the user through a found route, a retrieval processing section 35 for retrieving facilities, etc., a date and time processing section 36 for processing date, day of week, and time information, a traffic information processing section 37 for processing traffic information, and a vehicle position detection section 38 for calculating the current position of the vehicle, where by various navigation functions are provided.

Numeral 71 denotes a GPS receiver for receiving a GPS signal sent from a GPS satellite and detecting the latitude and longitude of the current position of the vehicle, numeral 72 denotes a speed sensor for generating a pulse every predetermined traveled distance, and numeral 73 denotes a gyro sensor for detecting the bearing of the vehicle. The vehicle position detection section 38 calculates the precise current position of the vehicle, the precise traveled distance of the vehicle, and the precise bearing of the vehicle based on the detected information. They make up position detector.

Numeral 80 denotes a traffic information receiver for receiving traffic information by radio communications from an external information center, etc. The traffic information processing section 37 acquires traffic restriction information of a time restriction road, etc., based on the map information and the traffic information. They make up traffic restriction information acquisition section.

Numeral 90 denotes a calendar clock for generating date, day of week, and time information. The date and time processing section 36 acquires the date, day of week, and time information from the calendar clock 90 and precisely calibrates the date, day of week, and time information based on date, day of week, and time information of an atomic clock installed in the GPS satellite, provided through the GPS receiver 71. They make up time information acquisition section.

Numeral 100 denotes a remote control as input section for enabling the user to enter route points of a destination, etc., and various pieces of operation and instruction information. The control section 31 performs various types of control based on the entered information.

The route searching section 33 searches for an optimum route to pass through route points from the current position of the vehicle at the current date, day of week, time based on the map information and the traffic restriction in formation. The route guide processing section 34 adds guide information to the found route. The user is guided through the route by an image displayed on the screen display 50 or by voice from the voice output unit 60.

In the invention, the route searching section 33 has functions of determining whether the area of the current position of the vehicle is an urban or suburban area (area determination section), setting a predetermined area or a predetermined time responsive to the determination result (setting section), and determining the presence or absence of restriction on each time restriction road depending on whether or not a time restriction road exists in the predetermined area centering around the current position of the vehicle and whether or not the restriction time period of the time restriction road overlaps the time period in the predetermined time from the current time (restriction presence/absence determination section).

Next, the ranges for the route searching section 33 to search for a time restriction road in a suburban area and an urban area in the first embodiment will be discussed.

Figure 2:
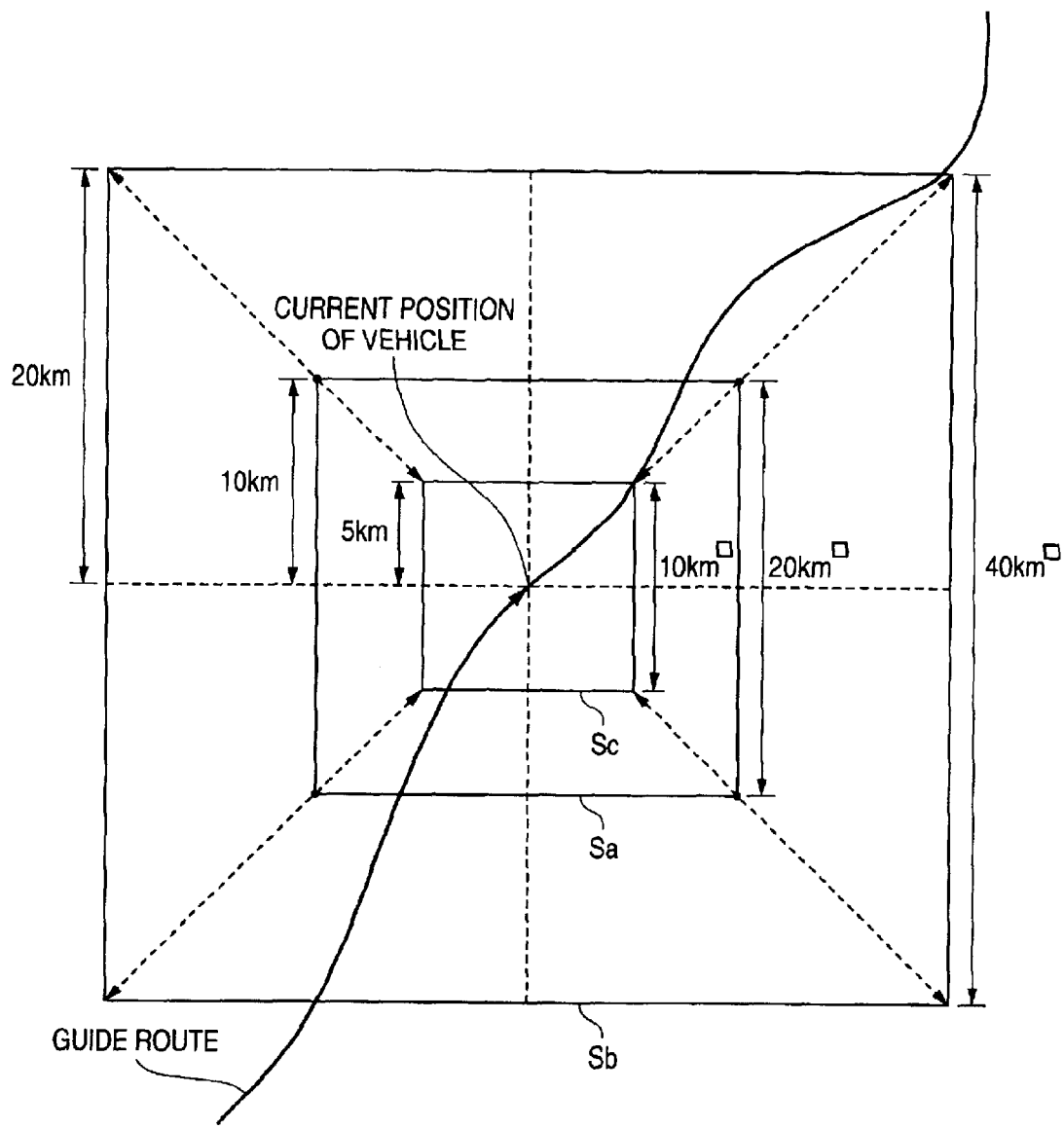
FIG. 2 is a schematic drawing to show the ranges searching for a time restriction road in route searching processing in the first embodiment of the invention.

FIG. 2 is a schematic drawing to show the ranges searching for a time restriction road in route searching processing in the first embodiment. It represents the difference between the ranges of predetermined areas S for the route searching section 33 in FIG. 1 to search for a time restriction road in a suburban area and an urban area assuming that vehicle run time $\Delta t$ is constant.

To begin with, as the range in which the vehicle can run within reference predetermined time $\Delta ta$=30 minutes, a rectangular area with in 20 km around centering around the current position of the vehicle is defined as reference area Sa.

Generally, in a suburban area, the number of signals is small and congestion less occurs and thus the run pace of the vehicle is fast as compared with an urban area. Therefore, the range in which the vehicle can run within $\Delta ta$ (=30 minutes) relatively widens and thus a rectangular area within 40 km (twice the length of one side of the reference area Sa) around centering around the current position of the vehicle is defined as area Sb and is set to a predetermined area in which a search is made for a time restriction road in a suburban area.

In an urban area, the number of signals and congestion increase and the run pace of the vehicle is slow as compared with a suburban area. Therefore, the range in which the vehicle can run within $\Delta ta$ (=30 minutes) relatively narrows and thus a rectangular area within 10 km (half the length of one side of the reference area Sa) around centering around the current position of the vehicle is defined as area Sc and is set to a predetermined area in which a search is made for a time restriction road in an urban area.

Next, the initial operation when the route searching section 33 in the first embodiment performs route searching while changing the range searching for a time restriction road depending on whether the area is a suburban area or an urban area will be discussed.

Figure 3:
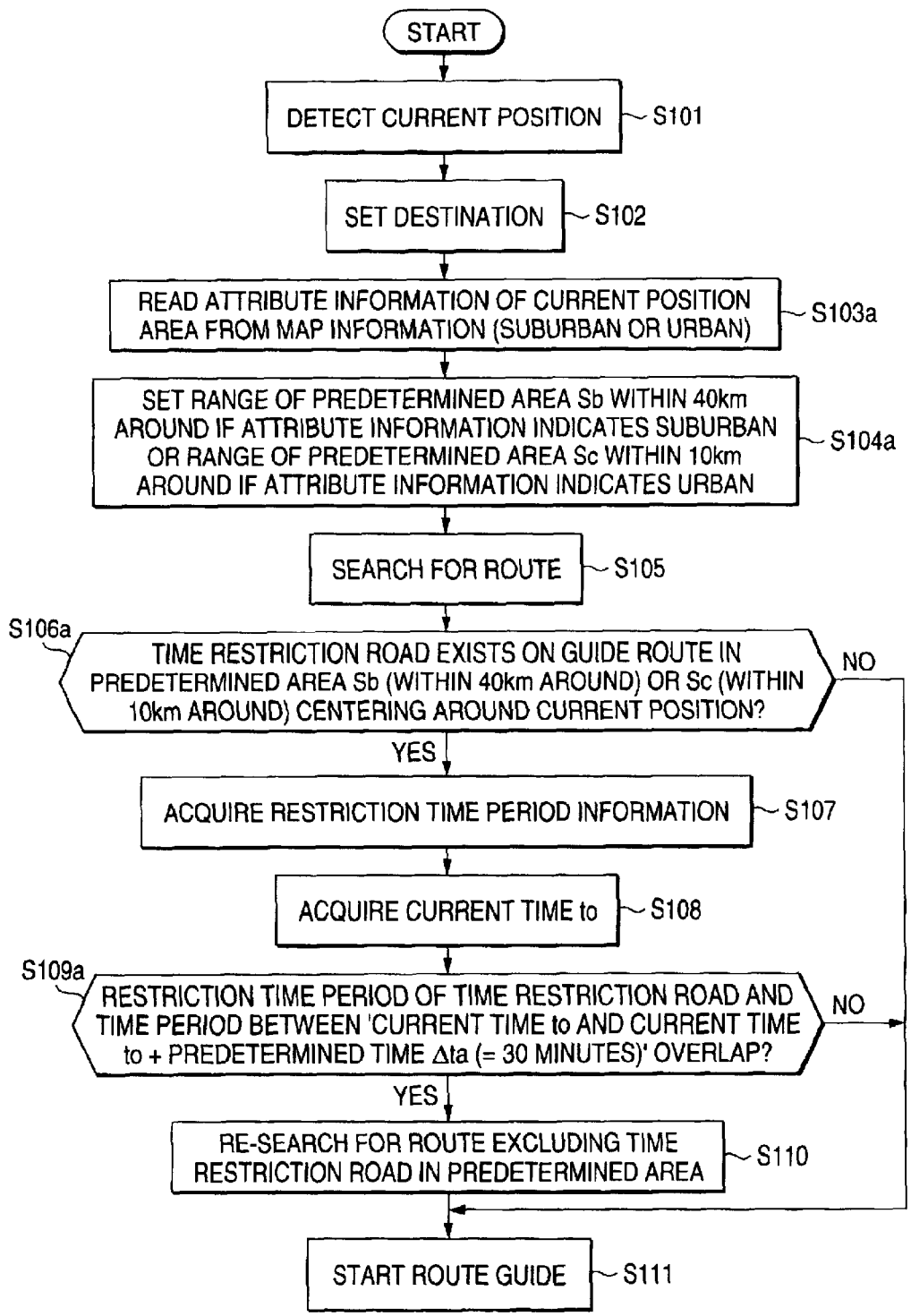
FIG. 3 is a flowchart to show rough operation of the first route searching in the first embodiment of the invention.

FIG. 3 is a flowchart to show rough operation of the first route searching in the first embodiment. It shows an example wherein the range of the predetermined area S searching for a time restriction road is changed depending on whether the area is a suburban area or an urban area in the first route searching after a destination is set.

The map information stored on the map information storage medium is provided with "suburban/urban area" information as attribute information of each zone and the "suburban/urban area" information is referenced for determining whether the area of the current position of the vehicle is a suburban area or an urban area.

First, the vehicle position detection section 38 detects the current position of the vehicle (step S101). Next, when a destination is set as the user operates the remote control 100 (step S102), the route searching section 33 acquires the attribute information of the area of the current position of the vehicle (suburban or urban area) from the map information in the map information management section 20 (step S103$a$) and sets the predetermined area Sb (within 40 km around) or Sc (within 10 km around) based on the acquired attribute information (step S104$a$). After setting the predetermined area, the route searching section 33 searches for a guide route from the current position to the destination (step S105) and checks whether or not a time restriction road exists on the guide route in the range of the predetermined area Sb or Sc (step S106$a$).

If a time restriction road exists, the route searching section 33 acquires the restriction time period from the map information or the traffic information received by the traffic information processing section 37 through the traffic information receiver 80 (step S107), acquires the current time to from the date and time processing section 36 (step S108), and makes a comparison between the restriction time period of the time restriction road and the time period of the duration from the current time to to the time resulting from adding predetermined time $\Delta ta$ (=30 minutes) to the current time to (to to to+$\Delta ta$) to determine whether or not the time periods overlap (step S109$a$). If the time periods overlap, the route searching section 33 re-searches for a guide route excluding the time restriction road (step S110) and starts a route guide (step S111).

If a time restriction road does not exist on the guide route in the range of the predetermined area Sb or Sc at step S106$a$ or if the time periods do not overlap at step S109$a$, the route searching section 33 does not re-search for a guide route and goes to step S111 and starts guiding the user through the guide route as it is.

Next, the operation of the route searching section 33 when the vehicle runs on the guide route found by executing the first route searching previously described with reference to FIG. 3 in the first embodiment will be discussed.

Figure 4:
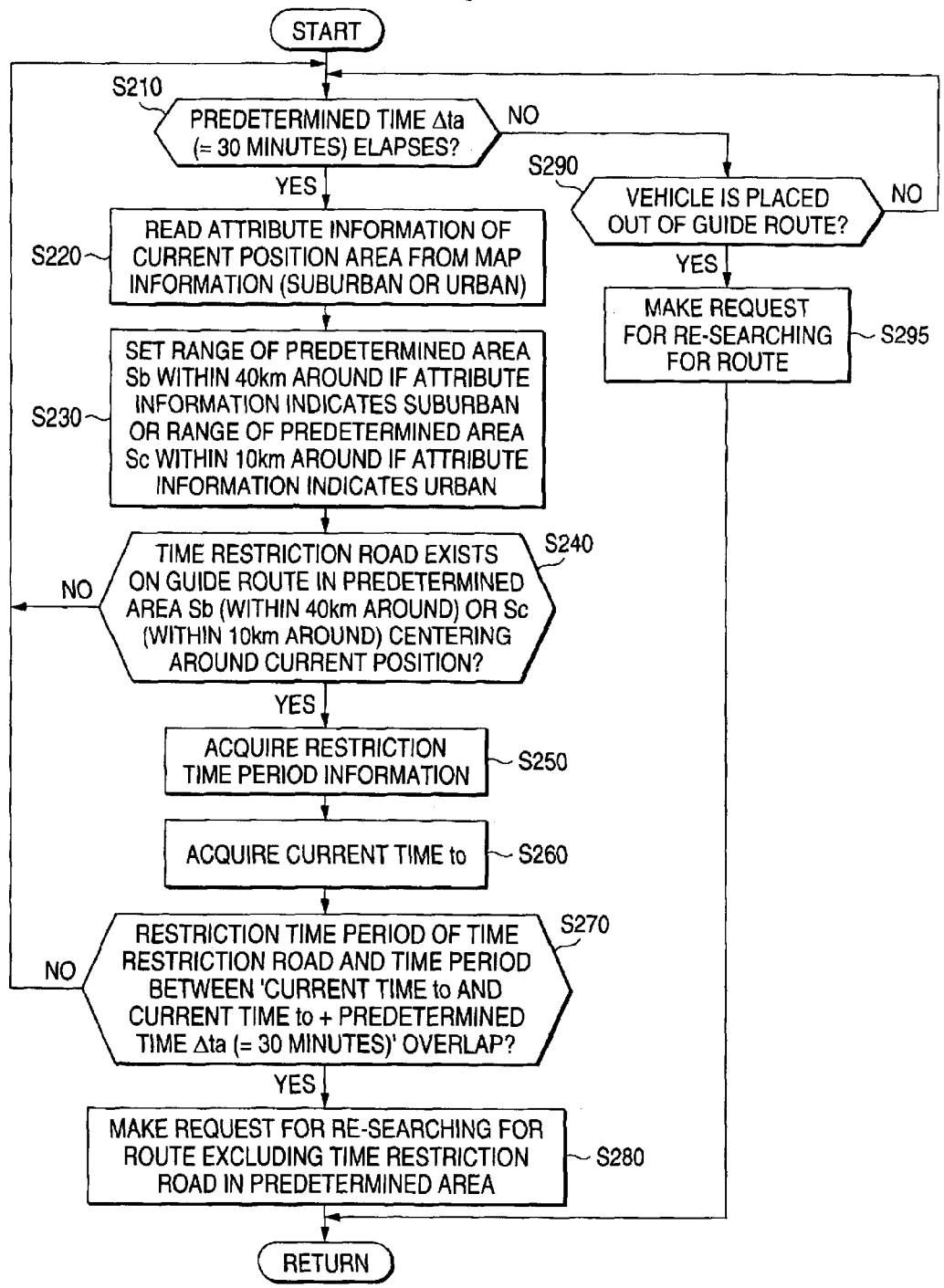
FIG. 4 is a flowchart to show rough operation of the route searching while a vehicle is running in the first embodiment of the invention.

FIG. 4 is a flowchart to show rough operation of the route searching while the vehicle is running in the first embodiment. It shows an example wherein the range of the predetermined area S searching for a time restriction road is changed depending on whether the area is a suburban area or an urban area in the route searching while the vehicle is running on the guide route.

First, the timing at which whether or not a time restriction road exists is checked while the vehicle is running will be discussed. The predetermined area Sb (suburban) or Sc (urban) in FIG. 2 is the range at which the vehicle can arrive within $\Delta ta$ (=30 minutes); in other words, there is a possibility that the vehicle may exit the predetermined area Sb or Sc in $\Delta ta$. Therefore, after the expiration of $\Delta ta$ after whether or not a time restriction road exists is once checked in the predetermined area Sb or Sc, there is a possibility that the vehicle may be placed out of the check range.

Considering the time interval of checking whether or not a time restriction road exists, ideally it is desirable that whether or not a time restriction road exists should be checked all the time. In fact, however, if the check operation is performed all the time, the load of the route searching on the navigation system grows unnecessarily.

From the viewpoints of thoroughly checking whether or not a time restriction road exists and decreasing fruitless check operation, whether or not a time restriction road exists may be checked every $\Delta ta$ because the predetermined area Sb, Sc is the range at which the vehicle can arrive within $\Delta ta$.

Alternatively, whether or not the current position of the vehicle is placed out of the range of the predetermined area Sb, Sc previously set maybe actually checked and whenever the vehicle is placed out of the range, whether or not a time restriction road exists may be checked.

In FIG. 4, first whether or not the predetermined time $\Delta ta$ (=30 minutes) elapses since execution of the route searching considering a time restriction road at the preceding time is checked (step S210). If the predetermined time $\Delta ta$ elapses, the route searching section 33 acquires the attribute information of the area of the current position of the vehicle (suburban or urban area) from the map information in the map information management section 20 (step S220) and sets the predetermined area Sb (within 40 km around) or Sc (within 10 km around) based on the acquired attribute information (step S230). After setting the predetermined area, the route searching section 33 checks whether or not a time restriction road exists on the guide route in the range of the predetermined area Sb or Sc (step S240).

If a time restriction road exists, the route searching section 33 acquires the restriction time period from the map information or the traffic information received by the traffic information processing section 37 through the traffic information receiver 80 (step S250), acquires the current time to from the date and time processing section 36 (step S260), and makes a comparison between the restriction time period of the time restriction road and the time period of the duration from the current time to to the time resulting from adding predetermined time $\Delta ta$ to the current time to (to to to+$\Delta ta$) to determine whether or not the time periods overlap (step S270) If the time periods overlap, the route searching section 33 makes a request for re-searching for a guide route excluding the time restriction road (step S280).

If the predetermined time $\Delta ta$ does not elapse at step S210, the route searching section 33 checks whether or not the current position of the vehicle is placed out of the guide route (step S290). If the current position is placed out of the guide route, the route searching section 33 makes a request for re-searching for a guide route (step S295); if the current position is not placed out of the guide route, the route searching section 33 does not make a request for re-searching for a guide route and returns to step S210.

If a time restriction road does not exist on the guide route in the range of the predetermined area Sb or Sc at step S240 or if the time periods do not overlap at step S270, the route searching section 33 does not make a request for re-searching for a guide route and returns to step S210.

The range S searching for a time restriction road is thus changed depending on whether the area is a suburban area or an urban area, whereby the user can be guided easily and without waste through an appropriate route avoiding a time restriction road in both a suburban area and an urban area.

According to the first embodiment, the route searching section 33 determines whether the area of the current position of the vehicle is an urban or suburban area, sets the predetermined area S responsive to the determination result, determines the presence or absence of restriction on each time restriction road depending on whether or not a time restriction road exists in the predetermined area S centering around the current position of the vehicle and whether or not the restriction time period of the time restriction road overlaps the time period in the predetermined time $\Delta t$ from the current time to, and searches for a route avoiding the time restriction road if the route searching section 33 determines the presence of restriction, so that the user can be guided rapidly and reliably through the optimum route considering the restriction time period of the time restriction road in both an urban area and a suburban area.

According to the first embodiment, if the area of the current position of the vehicle is an urban area, the predetermined area S is set to a narrow area, so that the user can be guided rapidly and reliably through the optimum route considering the restriction time period of the time restriction road in the urban area.

According to the first embodiment, if the area of the current position of the vehicle is a suburban area, the predetermined area S is set to a wide area, so that the user can be guided rapidly and reliably through the optimum route considering the restriction time period of the time restriction road in the suburban area.

According to the first embodiment, the map information is provided with attribute information indicating urban/suburban area and whether the area of the current position of the vehicle is an urban area or a suburban area is determined based on the attribute information, so that it becomes easy to determine whether the area is an urban area or a suburban area.

According to the first embodiment, whenever the vehicle moves out of the predetermined area S previously set, the presence or absence of restriction on each time restriction road is determined, so that the presence or absence of restriction on each time restriction road can be checked without waste and thoroughly and the user can always be guided reliably through the optimum route avoiding the time restriction road.

(Second Embodiment)

Next, as a second embodiment of the invention, an example will be discussed wherein the range S in which the route searching section 33 in FIG. 1 searches for a time restriction road is made constant and the value of predetermined time $\Delta t$ to be added to current time to when the restriction time period of a time restriction road overlap is determined is changed depending on whether the area is a suburban or urban area.

Figure 5:
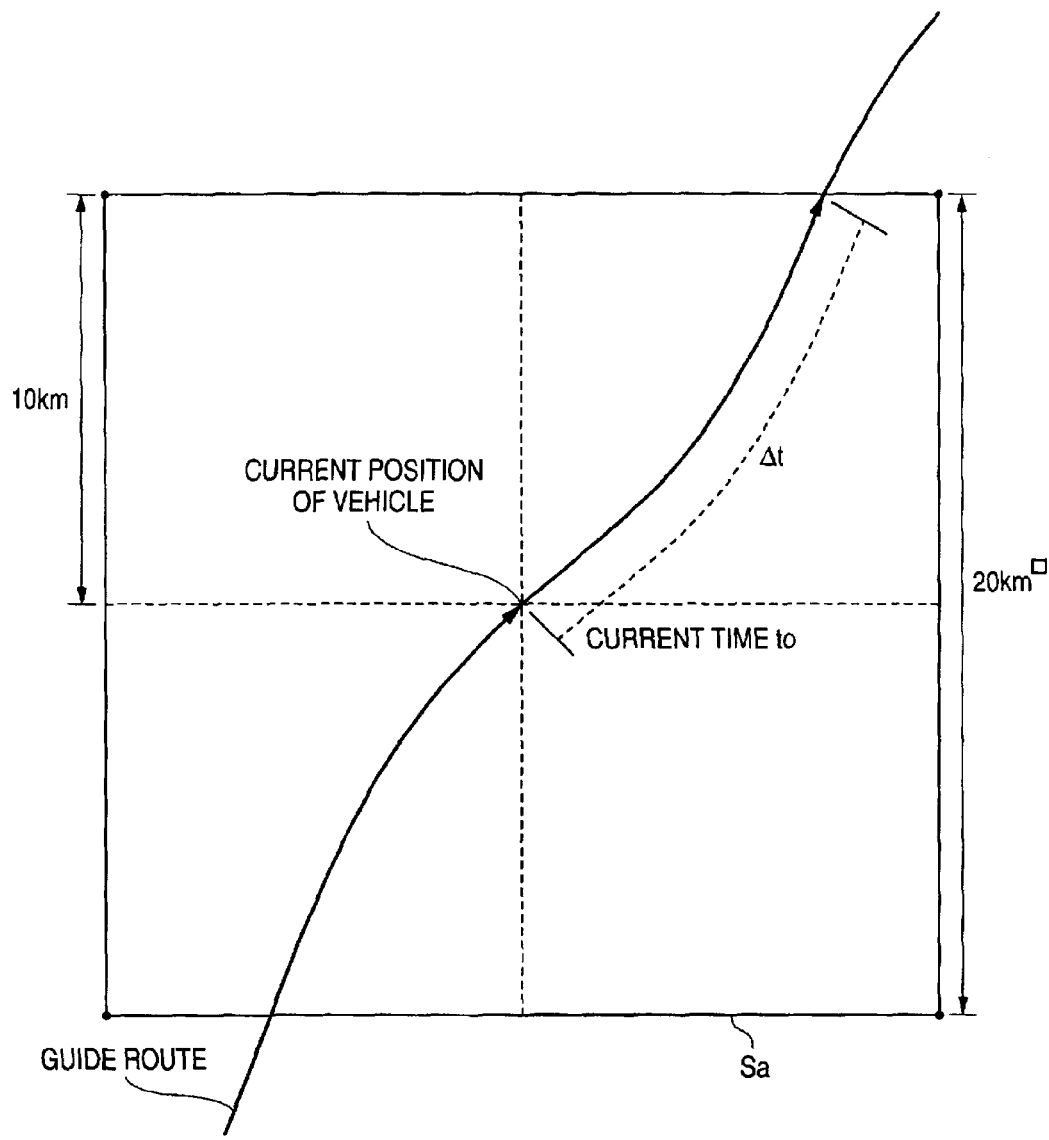
FIG. 5 is a schematic drawing to show a predetermined area and passage time in the second embodiment of the invention.
Figure 6:
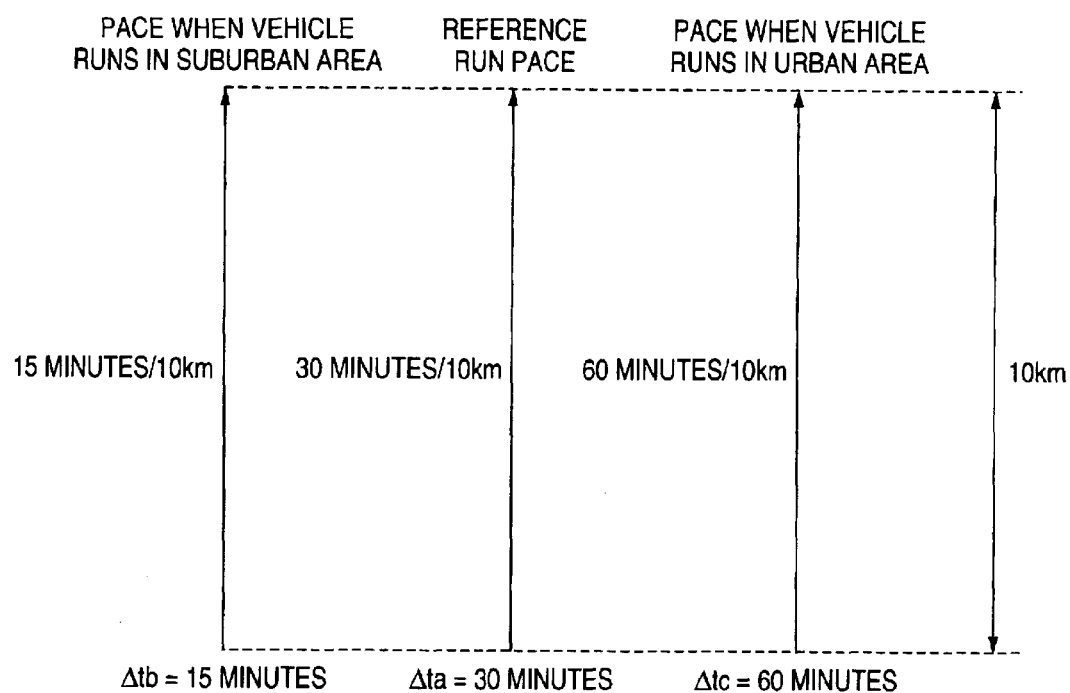
FIG. 6 is a schematic drawing to show vehicle run paces in a predetermined area in the second embodiment of the invention.
Figure 7:
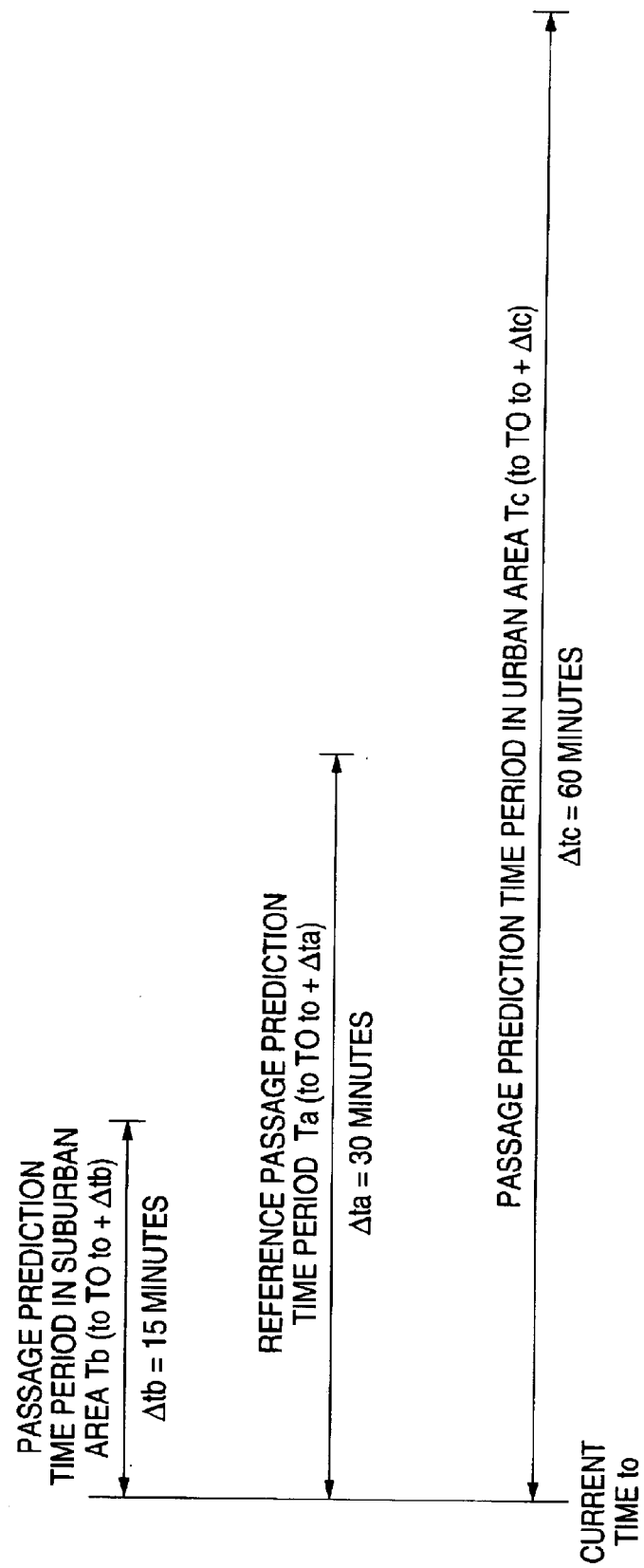
FIG. 7 is a schematic drawing to show vehicle passage prediction time periods in a predetermined area in the second embodiment of the invention.

FIGS. 5 to 7 are schematic drawings to describe the range searching for a time restriction road and the passage prediction time period through the time restriction road in the second embodiment. In the first embodiment, attention is focused on the difference between the vehicle run ranges S in a suburban area and an urban area in the predetermined time $\Delta t$; while, in the second embodiment, attention is focused on the difference between required time $\Delta t$ for a vehicle to run in a suburban area and that in an urban area in reference area Sa. That is, the run time $\Delta t$ is made constant in FIG. 2; while, FIGS. 5 to 7 represent the difference between passage prediction time period T of the vehicle in a suburban area and that in an urban area with run range Sa made constant.

FIG. 5 is a schematic drawing to show a predetermined area and passage time in the second embodiment. A rectangular area within 20 km around centering around the current position of the vehicle at the current time to is the reference predetermined area Sa, and the time required for the vehicle to run in the area Sa and pass therethrough is $\Delta t$.

FIG. 6 is a schematic drawing to show vehicle run paces in a predetermined area in the second embodiment. To begin with, as the reference pace, the time required for the vehicle to run reference distance 10 km is Δta=30 minutes. Since the run pace in a suburban area is relatively fast as compared with that in an urban area, the time required for the vehicle to run 10 km is a half the reference pace, Δtb=15 minutes/10 km. Since the run pace in an urban area is relatively slow as compared with that in a suburban area, the time required for the vehicle to run 10 km is twice the reference pace, Δtc=60 minutes/10 km.

FIG. 7 is a schematic drawing to show vehicle passage prediction time periods in a predetermined area in the second embodiment. It is considered according to the run paces that when the vehicle runs in a suburban area, it requires Δtb=15 minutes at the maximum for the vehicle to arrive at a place within 20 km around centering around the current position of the vehicle in the predetermined area Sa. That is, it is considered that the vehicle can pass through any place within 20 km around within time period 'to to to+Δtb' assuming that the current time is to.

When the vehicle runs in an urban area, it requires Δtc=60 minutes at the maximum for the vehicle to arrive at a place within 20 km around centering around the current position of the vehicle. It is also considered that the vehicle can pass through any place within 20 km around within time period 'to to to+Δtc.'

Here, the time period 'to to to+Δtb' is set as passage prediction time period when the vehicle runs in a suburban area, Tb, and the time period 'to to to+Δtc' is set as passage prediction time period when the vehicle runs in an urban area, Tc.

Next, the initial operation when the route searching section 33 in the second embodiment performs route searching while changing the vehicle passage prediction time period T in the predetermined area S depending on whether the area is a suburban area or an urban area will be discussed.

Figure 8:
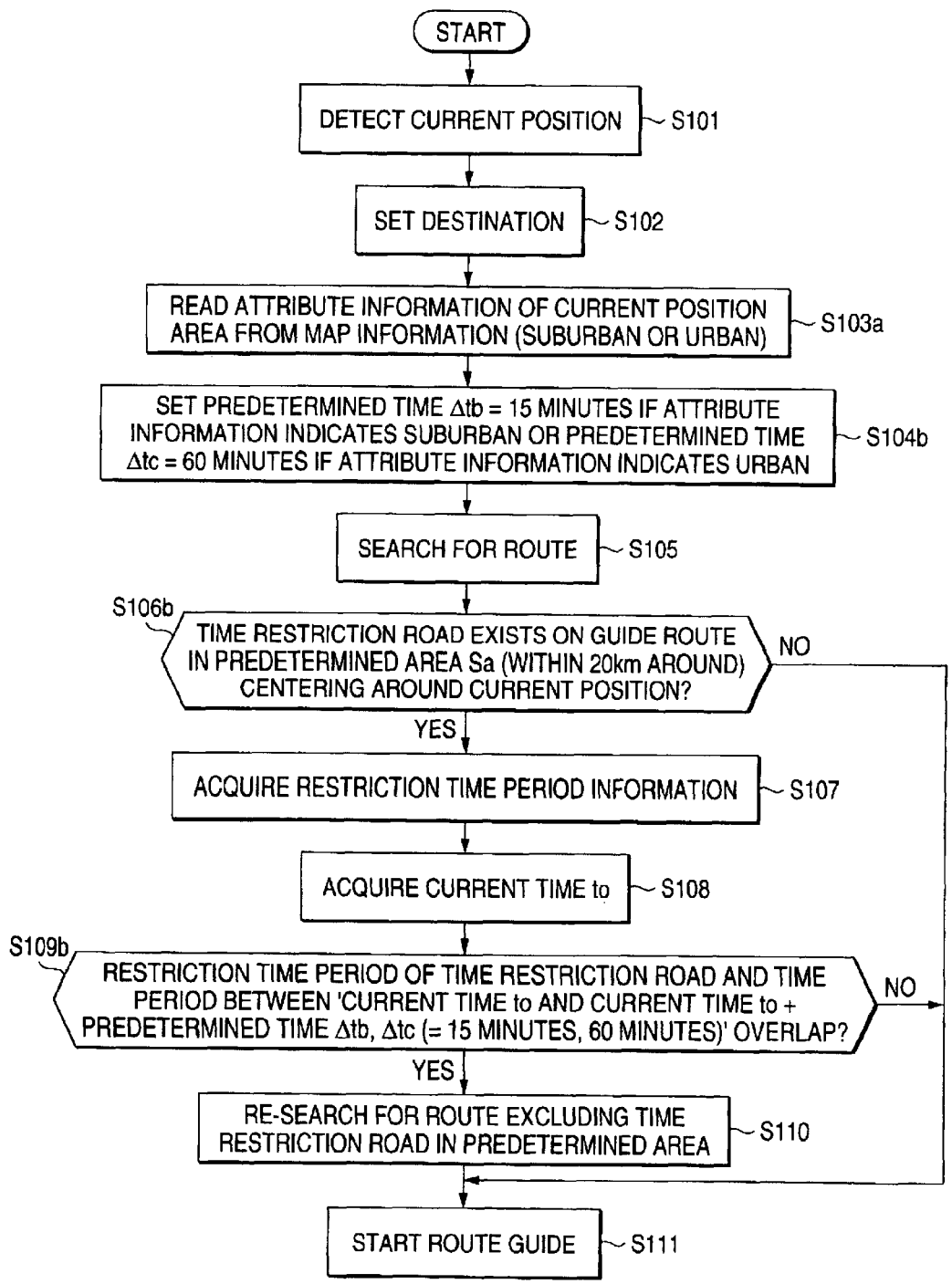
FIG. 8 is a flowchart to show rough operation of the first route searching in the second embodiment of the invention.

FIG. 8 is a flowchart to show rough operation of the first route searching in the second embodiment. It shows an example wherein the range of the predetermined area S searching for a time restriction road is fixed and the passage prediction time period T to be compared with the restriction time period of a time restriction road is changed depending on whether the area is a suburban area or an urban area in the first route searching after a destination is set.

In the second embodiment as in the first embodiment, map information stored on a map information storage medium is provided with "suburban/urban area" information as attribute information of each zone and the "suburban/urban area" information is referenced for determining whether the area of the current position of the vehicle is a suburban area or an urban area.

First, a vehicle position detection section 38 detects the current position of the vehicle (step S101). Next, when a destination is set as the user operates a remote control 100 (step S102), the route searching section 33 acquires the attribute information of the area of the current position of the vehicle (suburban or urban area) from the map information in a map information management section 20 (step S103a) and sets the predetermined time Δtb (=15 minutes) or Δtc (=60 minutes) based on the acquired attribute information (step S104b). After setting the predetermined time, the route searching section 33 searches for a guide route from the current position to the destination (step S105) and checks whether or not a time restriction road exists on the guide route in the range of the predetermined area Sa (within 20 km around) (step S106b).

If a time restriction road exists, the route searching section 33 acquires the restriction time period from the map information or the traffic information received by a traffic information processing section 37 through a traffic information receiver 80 (step S107), acquires the current time to from a date and time processing section 36 (step S108), and makes a comparison between the restriction time period of the time restriction road and passage prediction time period Tb (to to to+Δtb), Tc (to to to+Δtc) from the current time to to the time resulting from adding the predetermined time Δtb, Δtc (=15 minutes, 60 minutes) to the current time to to determine whether or not the time periods overlap (step S109b) If the time periods overlap, the route searching section 33 re-searches for a guide route excluding the time restriction road (step S110) and starts a route guide (step S111).

If a time restriction road does not exist on the guide route in the range of the predetermined area Sa at step S106b or if the time periods do not overlap at step S109b, the route searching section 33 does not re-search for a guide route and goes to step S111 and starts guiding the user through the guide route as it is.

Next, the operation of the route searching section 33 when the vehicle runs on the guide route found by executing the first route searching previously described with reference to FIG. 8 in the second embodiment will be discussed.

Figure 9:
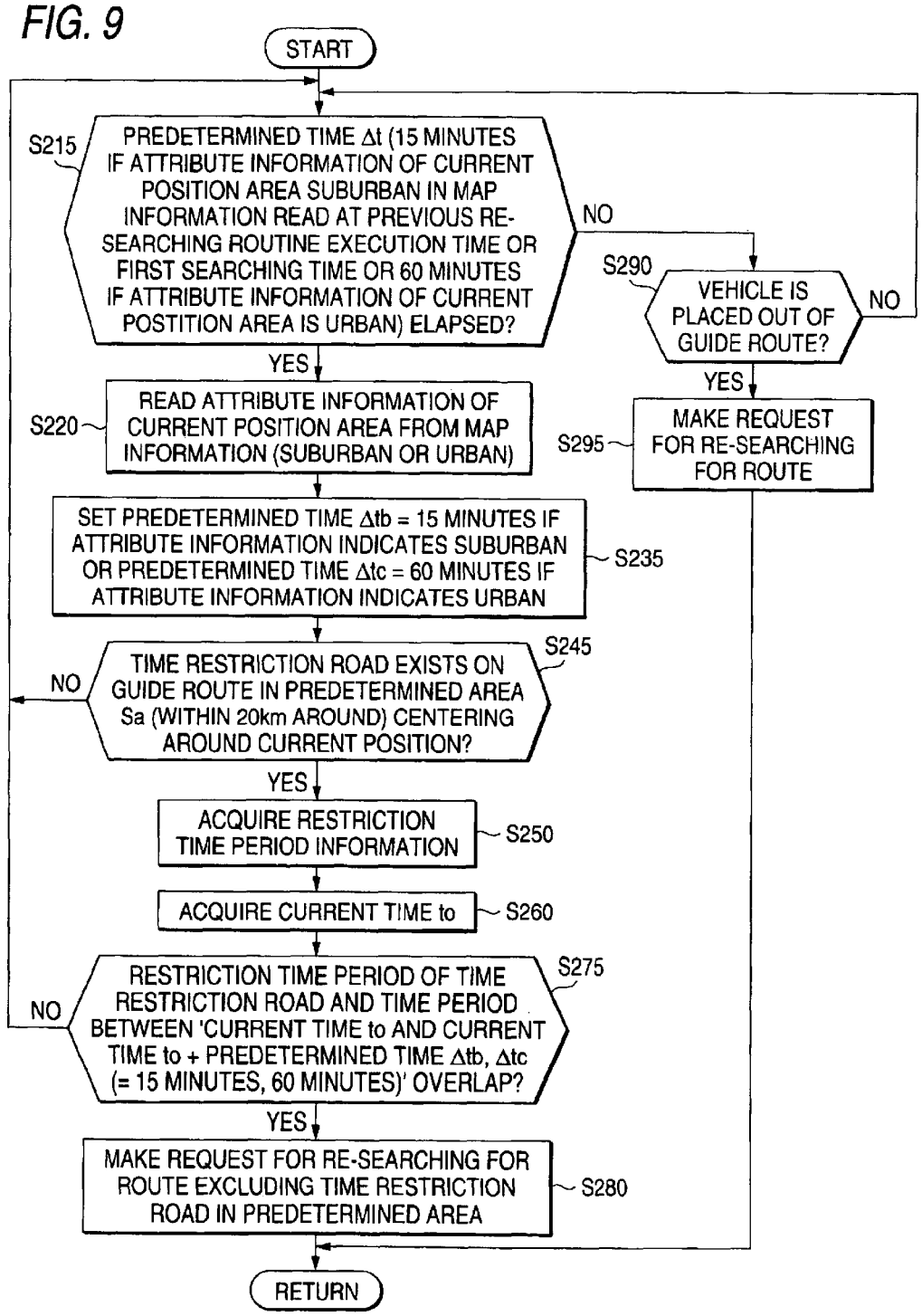
FIG. 9 is a flowchart to show rough operation of the route searching while a vehicle is running in the second embodiment of the invention.

FIG. 9 is a flowchart to show rough operation of the route searching while the vehicle is running in the second embodiment. It shows an example wherein the range of the reference area S searching for a time restriction road is fixed and the passage prediction time period T to be compared with the restriction time period of a time restriction road is changed depending on whether the area is a suburban area or an urban area in the route searching while the vehicle is running on the guide route.

First, the timing at which whether or not a time restriction road exists is checked while the vehicle is running will be discussed. The predetermined time Δtb (suburban) or Δtc (urban) in FIGS. 5 to 7 is the time required for the vehicle to pass through the range of the reference area Sa (within 20 km around); in other words, there is a possibility that the vehicle may exit the reference area Sa in the predetermined time Δtb (=15 minutes) or Δtc (=60 minutes). Therefore, after the expiration of the predetermined time Δtb or Δtc after whether or not a time restriction road exists is once checked in the reference area Sa, there is a possibility that the vehicle may be placed out of the check range.

Considering the time interval of checking whether or not a time restriction road exists, ideally it is desirable that whether or not a time restriction road exists should be checked all the time. In fact, however, if the check operation is performed all the time, the load of the route searching on the navigation system grows unnecessarily.

From the viewpoints of thoroughly checking whether or not a time restriction road exists and decreasing fruitless check operation, whether or not a time restriction road exists may be checked every predetermined time Δtb or Δtc because the predetermined time Δtb, Δtc is the time required for the vehicle to pass through the range of the reference area Sa.

Alternatively, whether or not the current position of the vehicle is placed out of the range of the reference area Sa previously set may be actually checked and whenever the vehicle is placed out of the range, whether or not a time restriction road exists may be checked.

In FIG. 9, first whether or not the predetermined time Δtb (=15 minutes) or Δtc (=60 minutes) previously set elapses since execution of the route searching considering a time restriction road at the preceding time is checked (step S215). If the predetermined time Δtb, Δtc elapses, the route searching section 33 acquires the attribute information of the area of the current position of the vehicle (suburban or urban area) from the map information in the map information management section 20 (step S220) and sets the predetermined time $\Delta$tb (=15 minutes) or $\Delta$tc (=60 minutes) based on the acquired attribute information (step S235). After setting the predetermined time, the route searching section 33 checks whether or not a time restriction road exists on the guide route in the range of the predetermined area Sa (within 20 km around) (step S245).

If a time restriction road exists, the route searching section 33 acquires the restriction time period from the map information or the traffic information received by the traffic information processing section 37 through the traffic information receiver 80 (step S250), acquires the current time to from the date and time processing section 36 (step S260), and makes a comparison between the restriction time period of the time restriction road and the passage prediction time period Tb (to to to+$\Delta$tb), Tc (to to to+$\Delta$tc) from the current time to to the time resulting from adding the predetermined time $\Delta$tb, $\Delta$tc (=15 minutes, 60 minutes) to the current time to to determine whether or not the time periods overlap (step S275). If the time periods overlap, the route searching section 33 makes a request for re-searching for a guide route excluding the time restriction road (step S280).

If the predetermined time $\Delta$tb, $\Delta$tc does not elapse at step S215, the route searching section 33 checks whether or not the current position of the vehicle is placed out of the guide route (step S290). If the current position is placed out of the guide route, the route searching section 33 makes a request for re-searching for a guide route (step S295); if the current position is not placed out of the guide route, the route searching section 33 does not make a request for re-searching for a guide route and returns to step S215.

If a time restriction road does not exist on the guide route in the range of the predetermined area Sa at step S245 or if the time periods do not overlap at step S275, the route searching section 33 does not make a request for re-searching for a guide route and returns to step S215.

The time duration $\Delta$t to be compared with the restriction time period of a time restriction road is thus changed depending on whether the area is a suburban area or an urban area, whereby the user can be guided easily and without waste through an appropriate route avoiding a time restriction road in both a suburban area and an urban area.

According to the second embodiment, the route searching section 33 determines whether the area of the current position of the vehicle is an urban or suburban area, sets the predetermined time $\Delta$t responsive to the determination result, determines the presence or absence of restriction on each time restriction road depending on whether or not a time restriction road exists in the predetermined area S centering around the current position of the vehicle and whether or not the restriction time period of the time restriction road overlaps the time period in the predetermined time $\Delta$t from the current time to, and searches for a route avoiding the time restriction road if the route searching section 33 determines the presence of restriction, so that the user can be guided rapidly and reliably through the optimum route considering the restriction time period of the time restriction road in both an urban area and a suburban area.

According to the second embodiment, if the area of the current position of the vehicle is an urban area, the predetermined time $\Delta$t is set to a long time, so that the user can be guided rapidly and reliably through the optimum route considering the restriction time period of the time restriction road in the urban area.

According to the second embodiment, if the area of the current position of the vehicle is a suburban area, the predetermined time $\Delta$t is set to a short time, so that the user can be guided rapidly and reliably through the optimum route considering the restriction time period of the time restriction road in the suburban area.

According to the second embodiment, whenever the predetermined time $\Delta$t previously set elapses, the presence or absence of restriction on each time restriction road is determined, so that the presence or absence of restriction on each time restriction road can be checked without waste and thoroughly and the user can always be guided reliably through the optimum route avoiding the time restriction road.

(Third Embodiment)

In the first and second embodiments, map information stored on the map information storage medium is provided with "suburban/urban area" information as attribute information of each zone and the "suburban/urban area" information is referenced for determining whether the area of the current position of the vehicle is a suburban area or an urban area. In a third embodiment of the invention, an example will be discussed wherein "suburban/urban area" information as attribute information entered by the user is referenced for determining whether the area of the current position of the vehicle is a suburban area or an urban area.

Figure 10:
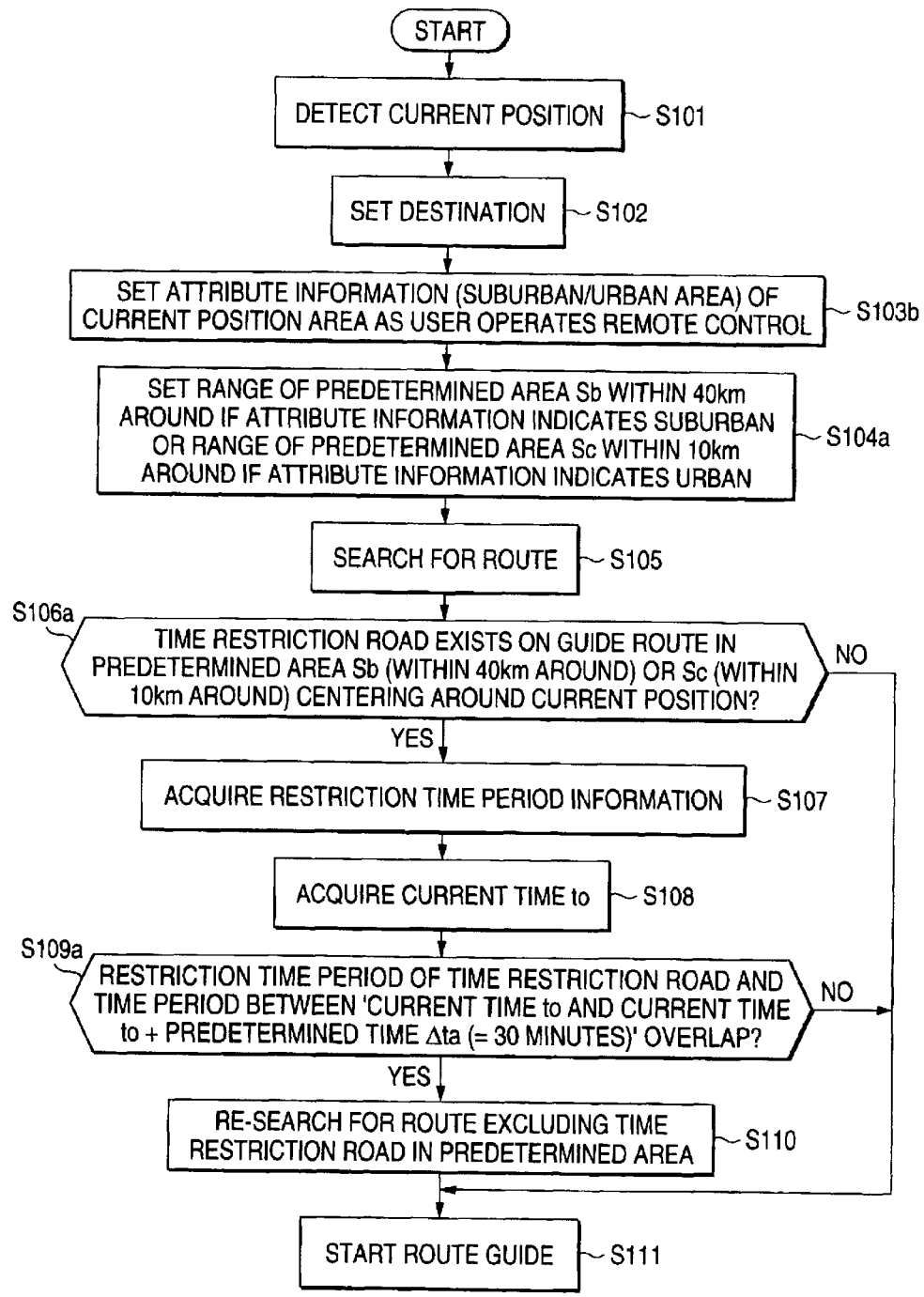
FIG. 10 is a flowchart to show rough operation of the first route searching in a third embodiment of the invention.
Figure 11:
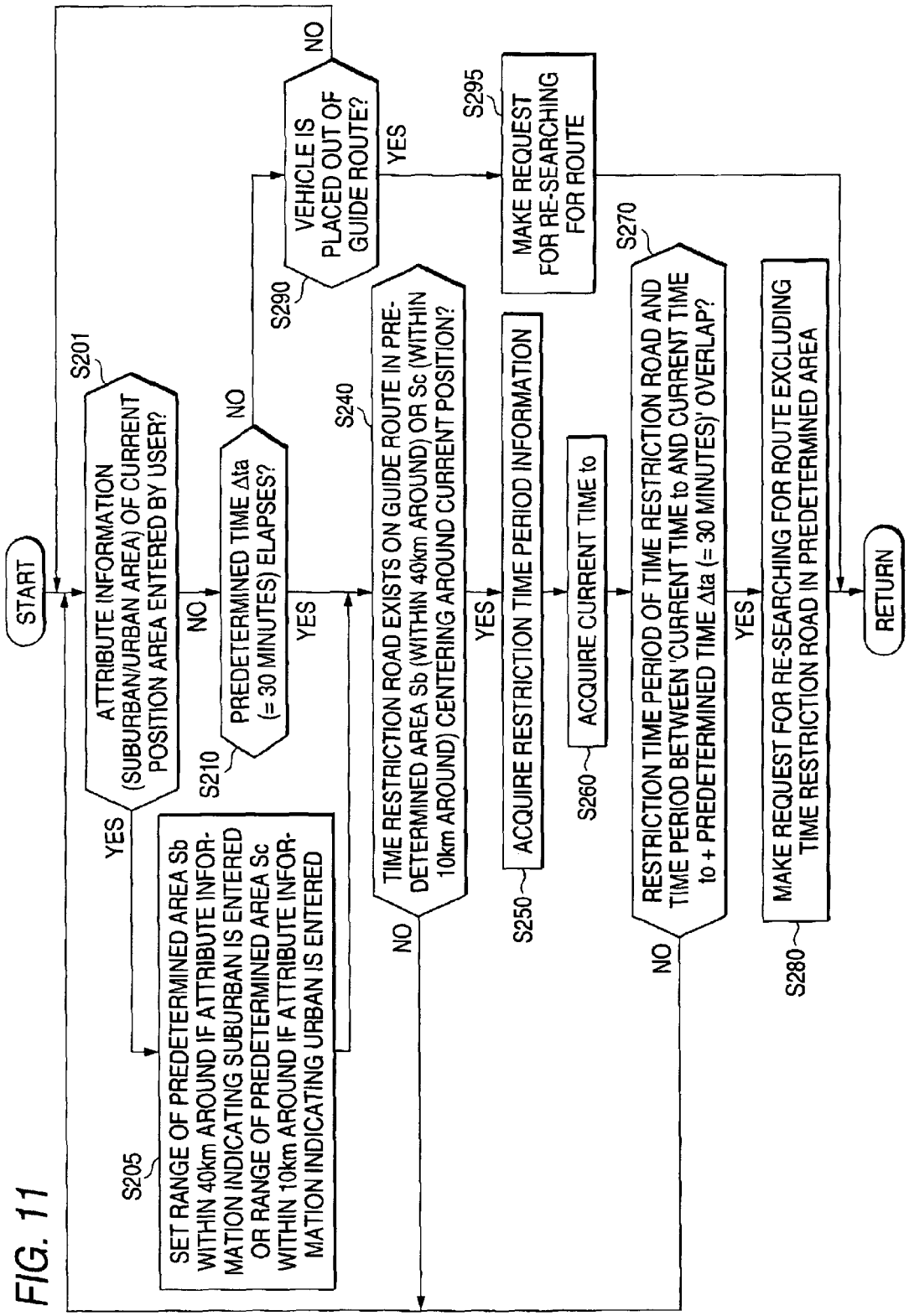
FIG. 11 is a flowchart to show rough operation of the route searching while a vehicle is running in the third embodiment of the invention.

FIGS. 10 and 11 are flowcharts to show rough operation of the first route searching and rough operation of the route searching while a vehicle is running in the third embodiment. They represent examples wherein the range of a predetermined area S searching for a time restriction road is changed, as in the first embodiment, based on the attribute information (suburban/urban area) of the area of the current position, entered by the user in the first route searching after a destination is set and the route searching while a vehicle is running.

In the first route searching after a destination is set, as in FIG. 10, a vehicle position detection section 38 detects the current position of the vehicle (step S101), and after a destination is set as the user operates a remote control 100 (step S102), the user further enters the attribute information (suburban/urban area) of the area of the current position (step S103b). Then, a route searching section 33 sets a predetermined area Sb (within 40 km around) or Sc (within 10 km around) based on the entered attribute information (step S104a). The subsequent operation is similar to that previously described with reference to FIG. 3 in the first embodiment.

In the route searching while the vehicle is running, as in FIG. 11, first, whether or not attribute information (suburban/urban area) of the area of the current position is entered by the user is checked (step S201). If attribute information is entered, the route searching section 33 sets a predetermined area Sb (within 40 km around) or Sc (within 10 km around) based on the entered attribute information (step S205). After setting the predetermined area, the route searching section 33 checks whether or not a time restriction road exists on the guide route in the range of the predetermined area Sb or Sc (step S240).

If attribute information is not entered at step S201, whether or not the predetermined time $\Delta$ta (=30 minutes) elapses since execution of the route searching considering a time restriction road at the preceding time is checked (step S210). If the predetermined time $\Delta$ta elapses, the route searching section 33 checks whether or not a time restriction road exists on the guide route in the range of the predetermined area Sb (within 40 km around) or Sc (within 10 km around) based on the attribute information (suburban/urban area) at the execution time of the route searching considering a time restriction road at the preceding time (step S240). The subsequent operation is similar to that previously described with reference to FIG. 4 in the first embodiment.

Figure 12:
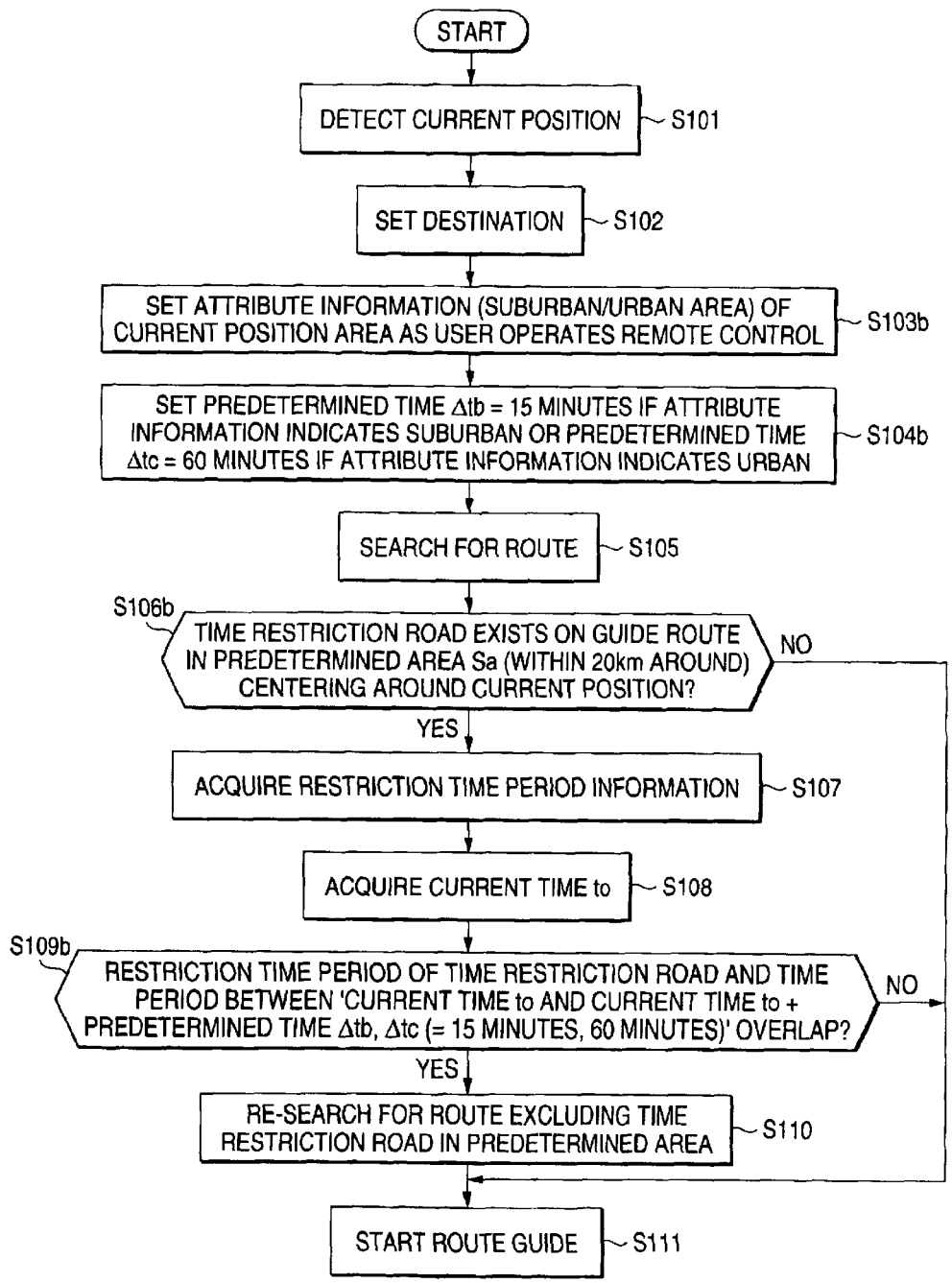
FIG. 12 is a flowchart to show another example of rough operation of the first route searching in the third embodiment of the invention.
Figure 13:
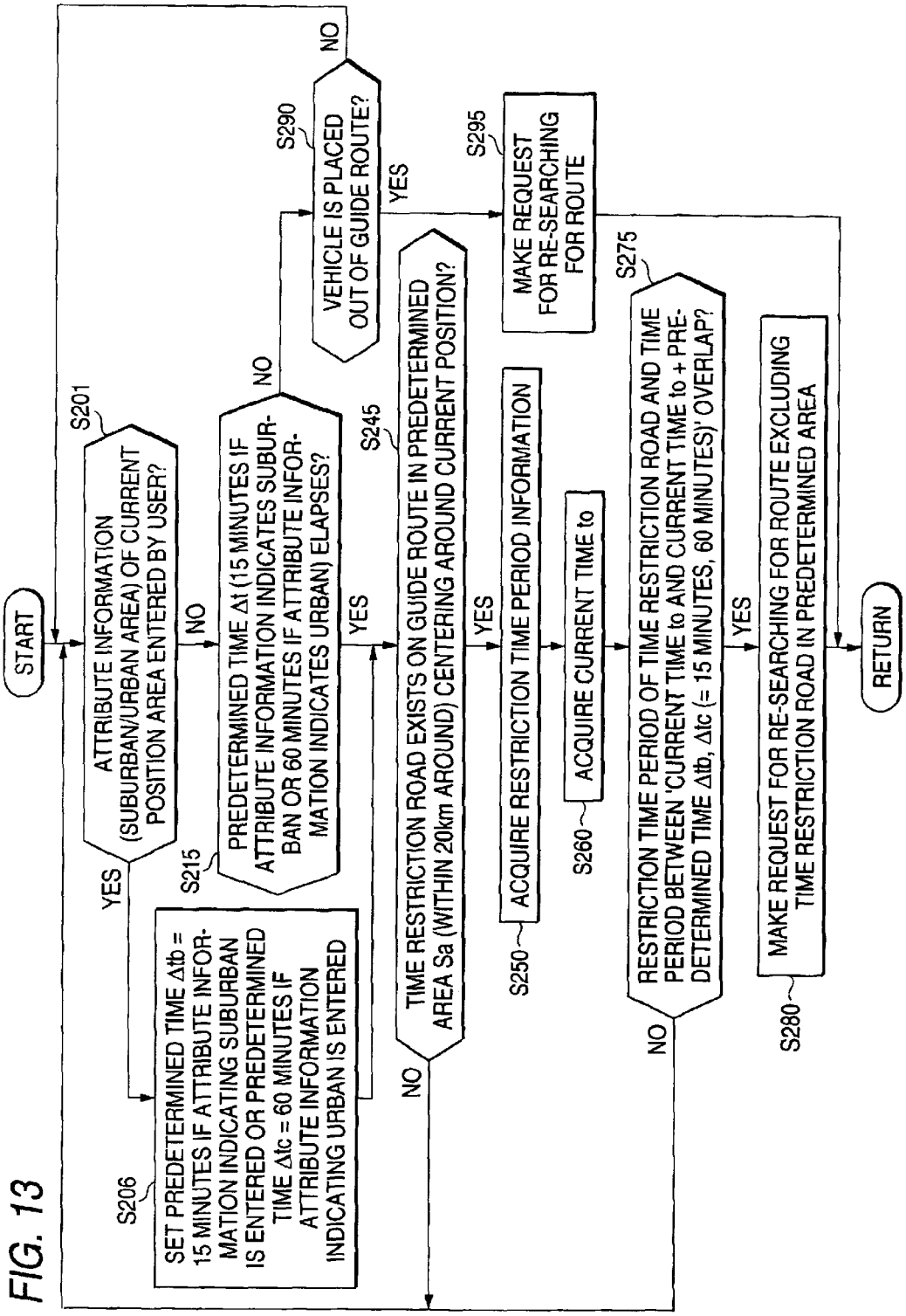
FIG. 13 is a flowchart to show another example of rough operation of the route searching while a vehicle is running in the third embodiment of the invention.

FIGS. 12 and 13 are flowcharts to show other examples of rough operation of the first route searching and rough operation of the route searching while a vehicle is running in the third embodiment. They represent examples wherein the passage prediction time period T to be compared with the restriction time period of a time restriction road in predetermined area S is changed depending on whether the area is a suburban area or an urban area, as in the second embodiment, based on the attribute information (suburban/urban area) of the area of the current position, entered by the user in the first route searching after a destination is set and the route searching while a vehicle is running.

In the first route searching after a destination is set, as in FIG. 12, the vehicle position detection section 38 detects the current position of the vehicle (step S101), and after a destination is set as the user operates the remote control 100 (step S102), the user further enters the attribute information (suburban/urban area) of the area of the current position (step S103b). Then, the route searching section 33 sets predetermined time $\Delta tb$ (=15 minutes) or $\Delta tc$ (=60 minutes) based on the entered attribute information (step S104b). The subsequent operation is similar to that previously described with reference to FIG. 8 in the second embodiment.

In the route searching while the vehicle is running, as in FIG. 13, first, whether or not attribute information (suburban/urban area) of the area of the current position is entered by the user is checked (step S201). If attribute information is entered, the route searching section 33 sets predetermined time $\Delta tb$ (=15 minutes) or $\Delta tc$ (=60 minutes) based on the entered attribute information (step S206). After setting the predetermined time, the route searching section 33 checks whether or not a time restriction road exists on the guide route in the range of a predetermined area Sa (within 20 km around) (step S245).

If attribute information is not entered at step S201, whether or not the predetermined time $\Delta tb$ (=15 minutes) or $\Delta tc$ (=60 minutes) elapses since execution of the route searching considering a time restriction road at the preceding time is checked (step S215). If the predetermined time $\Delta tb$ or $\Delta tc$ elapses, the route searching section 33 checks whether or not a time restriction road exists on the guide route in the range of the predetermined area Sa (within 20 km around) (step S245). The subsequent operation is similar to that previously described with reference to FIG. 9 in the second embodiment.

The user can thus enter the attribute information indicating an urban or suburban area, so that user's intention can be reflected on the range S searching for a time restriction road and the time duration $\Delta t$ to be compared with the restriction time period of the time restriction road.

According to the third embodiment, the user can enter the attribute information indicating an urban or suburban area and whether or not the area of the current position is an urban area or a suburban area is determined based on the entered attribute information, so that it is made possible to make a determination as to whether or not the area is an urban area or a suburban area on which user's intention can be reflected.

The attribute information indicating an urban or suburban area is acquired from the map information in the first and second embodiments or as the user enters the attribute information in the third embodiment, but both methods may be used in combination. That is, the attribute information indicating an urban or suburban area is acquired from the map information only when the user does not enter attribute information, whereby it becomes more appropriate and easier to determine whether or not the area is an urban or suburban area.

(Fourth Embodiment)

Next, a method of differentially displaying the time relation between the restriction time period of a time restriction road and the current time on a map in the configuration in FIG. 1 will be discussed as a fourth embodiment of the invention.

In the fourth embodiment, the navigation function section 30 in the configuration in FIG. 1 has functions of determining the difference between the current time and the restriction time period of a time restriction road if it exists in a guide area (restriction time determination section) and selecting an output mode of the time restriction road varying depending on the determination result (output mode selector).

Here, an example is shown wherein if a time restriction road exists in a map screen of a guide area displayed on a screen display 50 during route guiding or during driving without setting a route, the time restriction road is displayed in a different color according to the case where the current time to is contained in the restriction time period of the time restriction road, the case where the time from the current time to to the restriction start time of the time restriction road is within a predetermined time, or the case where the time from the current time to to the restriction start time of the time restriction road is longer than the predetermined time.

Figure 14:
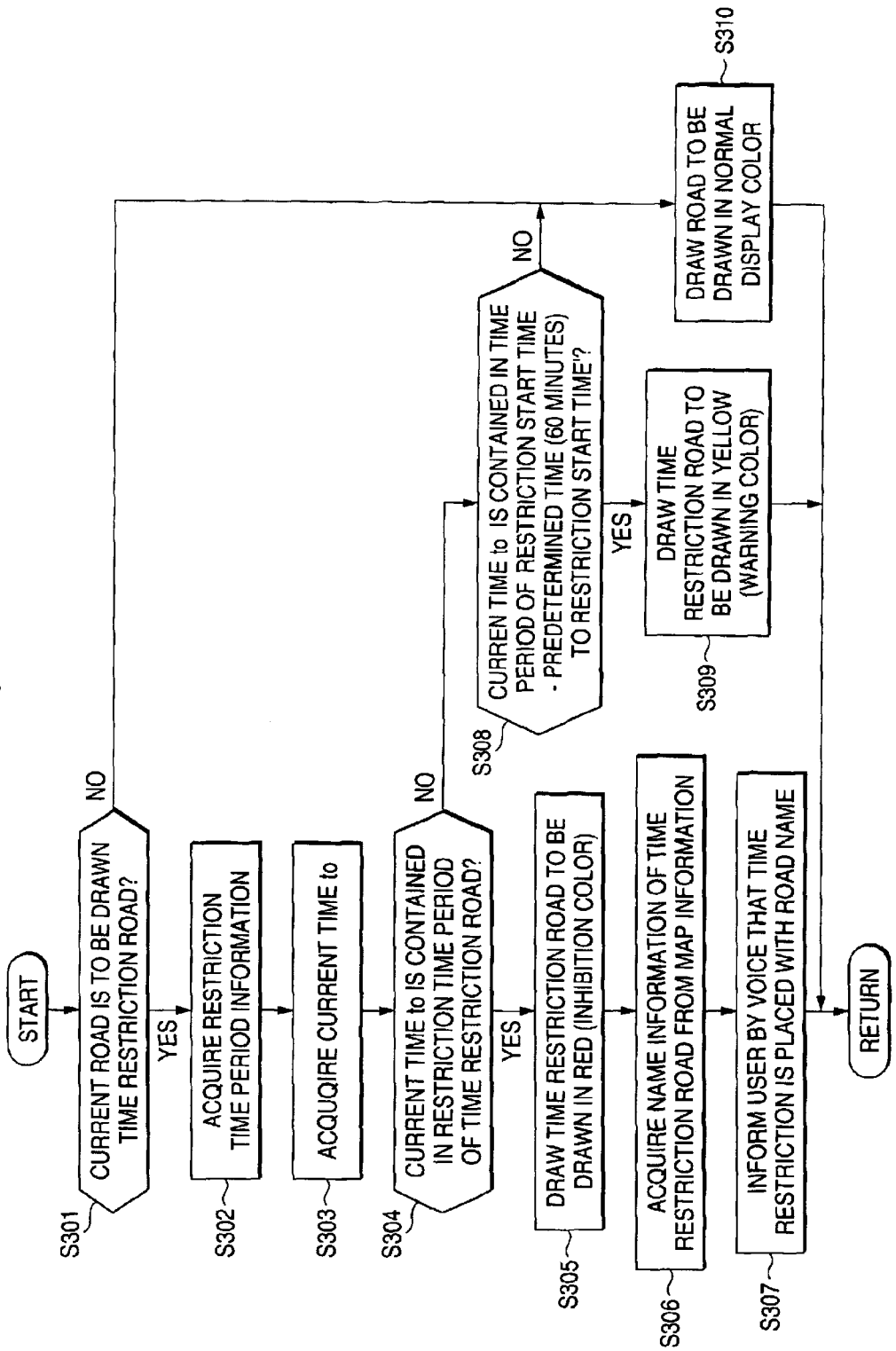
FIG. 14 is a flowchart to show rough operation of navigation system for differentially displaying a time restriction road in a fourth embodiment of the invention.

FIG. 14 is a flow chart to show rough operation of navigation system for differentially displaying a time restriction road in the fourth embodiment. First, whether or not the road to be drawn is a time restriction road is determined (step S301). If the road is a time restriction road, a map display section 32 acquires the restriction time period of the time restriction road from map information in a map information management section 20 or a traffic information processing section 37 acquires the restriction time period of the time restriction road from traffic information received by a traffic information receiver 80 (step S302). Next, a date and time processing section 36 acquires the current time to from a calendar clock 90 (step S303). Further, whether or not the current time to is contained in the restriction time period of the time restriction road is determined based on the acquired information (step S304).

If the current time to is contained in the restriction time period, the time restriction road is drawn in an inhibition color (for example, red) (step S305). Next, the name of the time restriction road is acquired from the map information (step S306), and the voice output unit 60 informs the user by voice that time restriction is placed with the name of the road (step S307).

If the current time to is not contained in the restriction time period, whether or not the current time to is contained in the time period of 'restriction start time—predetermined time (60 minutes) to restriction start time' is checked (step S308). If the current time to is contained in the time period, the time restriction road is drawn in a warning color (for example, yellow) (step S309).

If the road to be drawn is not a time restriction road at step S301 or if the current time to is not contained in the time period of 'restriction start time—predetermined time (60 minutes) to restriction start time' at step S308, the road to be drawn is drawn in a normal display color (step S310).

Figure 15:
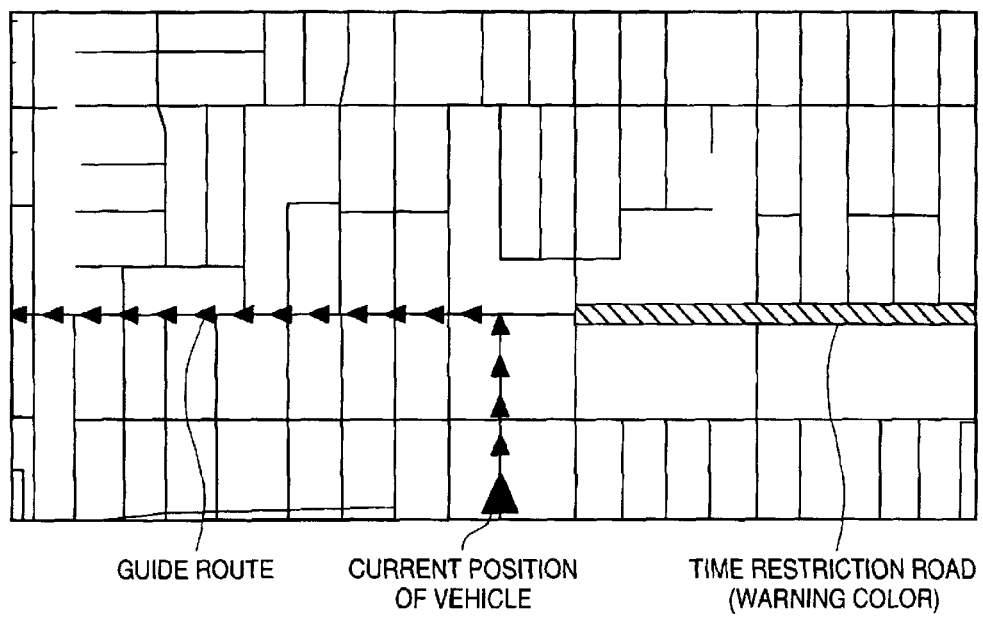
FIG. 15 is a drawing to show an example of differentiate display of a time restriction road in the fourth embodiment of the invention.
Figure 16:
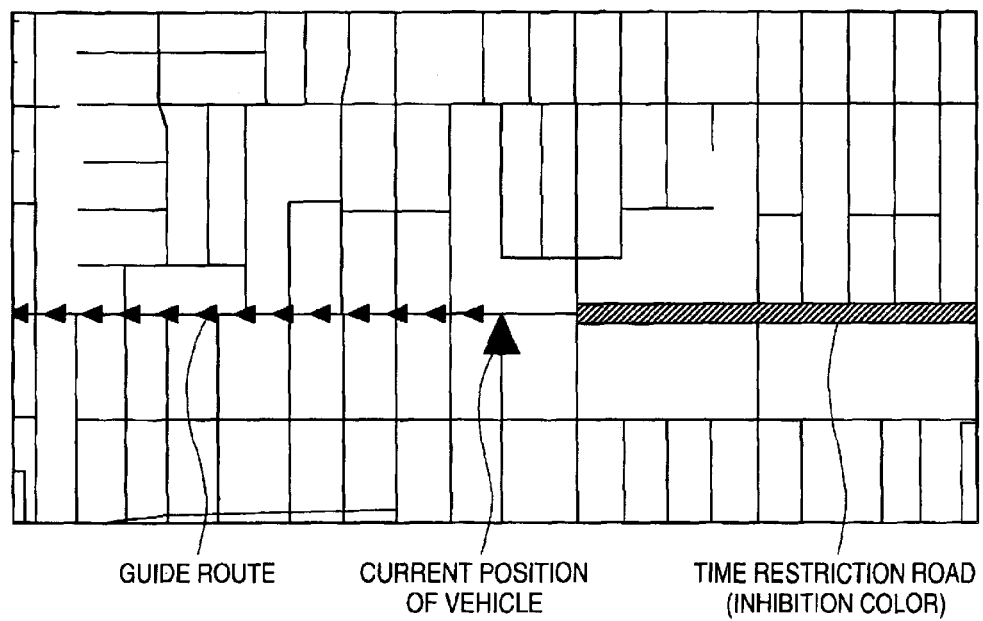
FIG. 16 is a drawing to show an example of differentiate display of a time restriction road in the fourth embodiment of the invention.

FIGS. 15 and 16 are drawings to show examples of differentiate display of time restriction roads in the fourth embodiment. FIG. 15 shows the case where the current time to is not contained in the restriction time period of the time restriction road on the display screen and is contained in the time period of 'restriction start time—predetermined time (60 minutes) to restriction start time' and the time restriction road is drawn in a warning color (yellow). FIG. 16 shows the case where the current time to is contained in the restriction time period of the time restriction road on the display screen and the time restriction road is drawn in an inhibition color (red).

Thus, the time relation between the restriction time period of the time restriction road and the current time to is displayed differentially on a map and is guided differentially by voice, whereby the user can be clearly informed of a road passable at the current point in time, a road made impassable soon, and an already impassable road.

According to the fourth embodiment, if a time restriction road exists in the guide area, the difference between the current time to and the restriction time period of the time restriction road is determined, and an output mode of the time restriction road varying depending on the determination result is selected for guiding the user, so that the user can easily recognize the time relation between the restriction time period of the time restriction road and the current time to.

According to the fourth embodiment, an output mode of the time restriction road is selected varying depending on the case where the current time to is contained in the restriction time period of the time restriction road in the guide area, the case where the time from the current time to to the restriction start time of the time restriction road is within a predetermined time, or the case where the time from the current time to to the restriction start time of the time restriction road is longer than the predetermined time, so that the user can clearly recognize the time relation between the restriction time period of the time restriction road and the current time to.

In the embodiments, the GPS receiver 71, the speed sensor 72, the gyro sensor 73, and the like are used as the position detector by way of example, but any other sensor such as a magnetic field sensor or an acceleration sensor, a D-GPS (Differential GPS), or a wireless network of position information service in the PHS, mobile telephones, etc., maybe used as the position detector.

In the embodiments, the disk unit 10 for reading map information from an information storage medium such as a CD-ROM or a DVD-ROM is used as the map information acquisition section by way of example, but the invention is not limited to it. Map information may be acquired using a memory IC (integrated circuit) such as flash memory, an optical disk such as a CD-R (recordable), a DVD-R, a CD-RW (rewritable), a DVD-RW, a DVD-RAM (random access memory), or an MD (mini disk), a magnetic disk such as a flexible disk or a hard disk, a memory card such as an IC memory card, a magnetic memory card, or an optical memory card, or any other readable/writable nonvolatile information storage medium.

Map information may be externally acquired using radio, the Internet, etc., whereby the system can be furthermore simplifies.

In the embodiments, the calendar clock 90 and the GPS receiver 71 are used as the time information acquisition section by way of example, but the current date, day of week, time information may also be externally acquired using radio, the Internet, etc., like the map information.

In the embodiments, the remote control 100 is used as the input section by way of example, but any other input machine such as an operation switch, a touch panel, a touch pen, a mouse, a trackball, an operation pad, or a voice recognition unit may be used.

In the embodiments, the screen display 50 such as a liquid crystal display and the voice output unit 60 such as a loudspeaker are used as the output section by way of example, but any other display such as a CRT (cathode ray tube) display, a plasma display, an EL (electro luminescence) display, an LED (light emitting diode) display, a VFD (vacuum fluorescent display), a projection display, a head up display, or a head mount display, any other voice output machine such as a headphone, an earphone, or a voice synthesizer, or any other output machine such as a printer may be used.

In the embodiments, the traffic information receiver 80 is used as the traffic restriction information acquisition section by way of example, but any other wireless communication machine such as a mobile telephone, a car phone, a satellite telephone, an MCA radio, a business-grade radio, or a power-thrifty radio, a road-vehicle communication system such as ETC (electronic toll collection) or DSRC (dedicated short range communication), or a communication line network of satellite communication, the Internet, etc., may be used.

In the embodiments, the traffic restriction information of time restriction roads, etc., is mainly described as the time restriction information, but the invention is not limited to it. The invention can be widely applied to time restriction information concerning a map. Position information and open, use, and elapsed time information contained in facility and store information, event information, tourism information, weather information, etc., may be compared with the current position and time in a similar manner and based on the comparison result, a re-search may be made for any desired guide route or the user may be guided through the route by differential display or voice, in which case similar advantages can also be provided.

In the embodiments, examples of applying the invention to the navigation systems mainly installed in vehicles are shown, but the invention may be applied to a navigation system installed in a portable terminal carried by the user or a mobile unit such as a train, a ship, or an airplane, any other mobile unit information system, or any other map information guide system, in which case similar advantages can also be provided, needless to say.

The invention is as described above and therefore can provide the following advantages:

The navigation system according to the invention includes position detector for detecting the current position of a mobile unit, map information acquisition section for acquiring map information, traffic restriction information acquisition section for acquiring traffic restriction information, time information acquisition section for acquiring current date, day of week, and time information, input section for entering a route point, route searching section for searching for an optimum route passing through the route point from the current position at the current date, day of week, and time based on the map information and the traffic restriction information, and output section for guiding the user through the found route by display or voice, when the route searching section includes area determination section for determining whether the area of the current position is an urban area or a suburban area, setting section for setting a predetermined area or a predetermined time responsive to the determination result, and restriction presence or absence determination section for determining the presence or absence of restriction on each time restriction road depending on whether or not a time restriction road exists in the predetermined area centering around the current position and whether or not the restriction time period of the time restriction road overlaps the time period in the predetermined time from the current time, and if the restriction presence or absence determination section determines the presence of restriction, the route searching section searches for a route avoiding the time restriction road, so that the navigation system has the advantage that it can guide the user rapidly and reliably through the optimum route considering the restriction time period of the time restriction road in both an urban area and a suburban area.

According to the navigation system according to the invention, if the area of the current position is an urban area, the setting section sets the predetermined area to a narrow area or the predetermined time to a long time, so that the navigation system has the advantage that it can guide the user rapidly and reliably through the optimum route considering the restriction time period of the time restriction road in the urban area.

According to the navigation system according to the invention, if the area of the current position is a suburban area, the setting section sets the predetermined area to a wide area or the predetermined time to a short time, so that the navigation system has the advantage that it can guide the user rapidly and reliably through the optimum route considering the restriction time period of the time restriction road in the suburban area.

According to the navigation system according to the invention, the map information is provided with attribute information indicating urban/suburban area and the area determination section determines whether the area of the current position is an urban area or a suburban area based on the attribute information, so that the navigation system has the advantage that it becomes easy to determine whether the area is an urban area or a suburban area.

According to the navigation system according to the invention, the input section enables the user to enter attribute information indicating urban/suburban area and the area determination section determines whether the area of the current position is an urban area or a suburban area based on the attribute information entered by the user, so that the navigation system has the advantage that it makes it possible to make a determination as to whether or not the area is an urban area or a suburban area on which user's intention can be reflected.

According to the navigation system according to the invention, whenever the mobile unit moves out of the predetermined area previously set or whenever the predetermined time previously set elapses, the restriction presence or absence determination section determines the presence or absence of restriction on the time restriction road, so that the navigation system has the advantage that the presence or absence of restriction on each time restriction road can be checked without waste and thoroughly and the user can always be guided reliably through the optimum route avoiding the time restriction road.

The navigation system according to the invention includes map information acquisition section for acquiring map information, traffic restriction information acquisition section for acquiring traffic restriction information, time information acquisition section for acquiring current date, day of week, and time information, output section for providing the user with the map information or the traffic restriction information by display or voice, restriction time determination section, if a time restriction road exists in a guide area, for determining the difference between the restriction time period of the time restriction road, and the current time and output mode selector for selecting an output mode of the time restriction road varying depending on the determination result, wherein the output section guides the user through the time restriction road according to the selected output mode, so that the navigation system has the advantage that it enables the user to easily recognize the time relation between the restriction time period of the time restriction road and the current time.

In the navigation system according to the invention, the output mode selector selects an output mode of the time restriction road varying depending on the case where the current time is contained in the restriction time period of the time restriction road in the guide area, the case where the time from the current time to the restriction start time of the time restriction road is within a predetermined time, or the case where the time from the current time to the restriction start time of the time restriction road is longer than the predetermined time, so that the navigation system has the advantage that it enables the user to clearly recognize the time relation between the restriction time period of the time restriction road and the current time.

The route searching method according to the invention includes a position detection step of detecting the current position of a mobile unit, a map information acquisition step of acquiring map information, a traffic restriction information acquisition step of acquiring traffic restriction information, a time information acquisition step of acquiring current date, day of week, and time information, an input step of entering a route point, a route searching step of searching for an optimum route passing through the route point from the current position at the current date, day of week, and time based on the map information and the traffic restriction information, and an output step of guiding the user through the found route by display or voice, wherein the route searching step includes an area determination step of determining whether the area of the current position is an urban area or a suburban area, a setting step of setting a predetermined area or a predetermined time responsive to the determination result, and a restriction presence or absence determination step of determining the presence or absence of restriction on each time restriction road depending on whether or not a time restriction road exists in the predetermined area centering around the current position and whether or not the restriction time period of the time restriction road overlaps the time period in the predetermined time from the current time, and if the restriction presence or absence determination step determines the presence of restriction, the route searching step searches for a route avoiding the time restriction road, so that the route searching method has the advantage that it can guide the user rapidly and reliably through the optimum route considering the restriction time period of the time restriction road in both an urban area and a suburban area.

The map information guide method according to the invention includes a map information acquisition step of acquiring map information, a traffic restriction information acquisition step of acquiring traffic restriction information, a time information acquisition step of acquiring current date, day of week, and time information, an output step of providing the user with the map information or the traffic restriction information by display or voice, a restriction time determination step, if a time restriction road exists in a guide area, of determining the difference between the restriction time period of the time restriction road and the current time, and an output mode selection step of selecting an output mode of the time restriction road varying depending on the determination result, wherein the output step guides the user through the time restriction road according to the selected output mode, so that the map information guide method has the advantage that it enables the user to easily recognize the time relation between the restriction time period of the time restriction road and the current time.

What is claimed is:

1. A navigation system comprising:

position detector for detecting the current position of a mobile unit, map information acquisition section for acquiring map information, traffic restriction information acquisition section for acquiring traffic restriction information, time information acquisition section for acquiring current date, day of week, and time information, input section for entering a route point, route searching section for searching for an optimum route passing through the route point from the current position at the current date, day of week, and time based on the map information and the traffic restriction information, and output section for guiding a user through the found route by display or voice, wherein said route searching section includes;

area determination section for determining whether an area of the current position is an urban area or a suburban area, setting section for setting a predetermined area or a predetermined time responsive to the determination result, and restriction presence or absence determination section for determining the presence or absence of restriction on each time restriction road depending on whether or not a time restriction road exists in the predetermined area centering around the current position and whether or not a restriction time period of the time restriction road overlaps a time period in the predetermined time from the current time, and if the restriction presence or absence determination section determines the presence of restriction, said route searching section searches for a route avoiding the time restriction road.

2. The navigation system as claimed in claim 1 wherein if the area of the current position is an urban area, said setting section sets the predetermined area to a narrow area or the predetermined time to a long time.

3. The navigation system as claimed in claim 1 wherein if the area of the current position is a suburban area, said setting section sets the predetermined area to a wide area or the predetermined time to a short time.

4. The navigation system as claimed in claim 1, wherein the map information is provided with attribute information indicating urban/suburban area, and said area determination section determines whether the area of the current position is an urban area or a suburban area based on the attribute information.

5. The navigation system as claimed in claim 1, wherein said input section enables the user to enter attribute information indicating urban/suburban area, and said area determination section determines whether the area of the current position is an urban area or a suburban area based on the attribute information entered by the user.

6. The navigation system as claimed in claim 1, wherein whenever the mobile unit moves out of the predetermined area previously set or whenever the predetermined time previously set elapses, said restriction presence or absence determination section determines the presence or absence of restriction on the time restriction road.

7. A route searching method comprising:

a position detection step of detecting the current position of a mobile unit, a map information acquisition step of acquiring map information, a traffic restriction information acquisition step of acquiring traffic restriction information, a time information acquisition step of acquiring current date, day of week, and time information, an input step of entering a route point, a route searching step of searching for an optimum route passing through the route point from the current position at the current date, day of week, and time based on the map information and the traffic restriction information, and an output step of guiding a user through the found route by display or voice, wherein the route searching step includes;

an area determination step of determining whether an area of the current position is an urban area or a suburban area, a setting step of setting a predetermined area or a predetermined time responsive to the determination result, and a restriction presence or absence determination step of determining the presence or absence of restriction on each time restriction road depending on whether or not a time restriction road exists in the predetermined area centering around the current position and whether or not a restriction time period of the time restriction road overlaps a time period in the predetermined time from the current time, and if the restriction presence or absence determination step determines the presence of restriction, the route searching step searches for a route avoiding the time restriction road.

* * * * *